(12) United States Patent
Kim et al.

(10) Patent No.: US 8,059,681 B2
(45) Date of Patent: Nov. 15, 2011

(54) METHOD AND APPARATUS FOR TRANSMITTING/RECEIVING PACKET IN MOBILE COMMUNICATION SYSTEM

(75) Inventors: Soeng-Hun Kim, Suwon-si (KR);
Sung-Ho Choi, Suwon-si (KR);
Kyeong-In Jeong, Hwaseong-si (KR);
Gert-Jan Van Lieshout, Middlesex (GB); Himke Van Der Velde, Middlesex (GB)

(73) Assignee: Samsung Electronics Co., Ltd. (KR)

( * ) Notice: Subject to any disclaimer, the term of this patent is extended or adjusted under 35 U.S.C. 154(b) by 713 days.

(21) Appl. No.: 11/799,675

(22) Filed: May 2, 2007

(65) Prior Publication Data
US 2007/0263568 A1 Nov. 15, 2007

(30) Foreign Application Priority Data

May 2, 2006 (KR) .................. 10-2006-0039728
Sep. 15, 2006 (KR) .................. 10-2006-0089677
Mar. 23, 2007 (KR) .................. 10-2007-0028910

(51) Int. Cl.
*H04J 3/16* (2006.01)
(52) U.S. Cl. ......... 370/469; 370/470; 370/473; 370/474
(58) Field of Classification Search .............. 370/469
See application file for complete search history.

(56) References Cited

U.S. PATENT DOCUMENTS

| 5,020,055 | A | 5/1991 | May, Jr. |
| 5,471,474 | A | 11/1995 | Grobicki et al. |
| 5,758,089 | A * | 5/1998 | Gentry et al. ............... 709/234 |
| 6,324,178 | B1 * | 11/2001 | Lo et al. ...................... 370/392 |
| 6,438,123 | B1 * | 8/2002 | Chapman ..................... 370/351 |
| 7,321,589 | B2 * | 1/2008 | Lohr et al. .................... 370/394 |
| 7,330,460 | B1 * | 2/2008 | Hagirahim et al. .......... 370/352 |
| 7,380,015 | B1 * | 5/2008 | Nakajima et al. ............ 709/232 |
| 2002/0027919 | A1 * | 3/2002 | Eneroth et al. ............ 370/395.1 |
| 2005/0021365 | A1 | 1/2005 | Nakfoor |
| 2005/0074024 | A1 * | 4/2005 | Kim et al. .................... 370/432 |
| 2005/0213605 | A1 * | 9/2005 | Kim et al. .................... 370/466 |
| 2007/0058595 | A1 * | 3/2007 | Classon et al. ............... 370/337 |
| 2007/0091810 | A1 * | 4/2007 | Kim et al. .................... 370/236 |

FOREIGN PATENT DOCUMENTS

| EP | 0 935 363 | 6/1998 |
| EP | 1 030 484 | 1/2000 |
| WO | WO 97/08838 | 3/1997 |

OTHER PUBLICATIONS

Seifert, R., "The Switch Book, The Complete Guide to LAN Switching Technology", 2000, Robert Ipsen, p. 55-57.*
Nokia, "MAC Multiplexing and Numbering", 3GPP TSG-RAN WG2 AdHoc, Jun. 21st-24th, 2004.
Universal Mobile Telecommunications System (UMTS); Medium Access Control (MAC) Protocol Specification (3GPP TS 25.321 Version 7.0.0 Release 7).
ETSI TS 125 321 ETSI Standards, Mar. 1, 2006.

* cited by examiner

*Primary Examiner* — Charles Appiah
*Assistant Examiner* — Stamford Hwang
(74) *Attorney, Agent, or Firm* — The Farrell Law Firm, P.C.

(57) ABSTRACT

Disclosed is a method and apparatus for transmitting/receiving a packet in a mobile communication system. When upper layer packets are multiplexed into a packet whose overall size is informed via a separate path, the size of the upper layer packet is not signaled if it can be calculated from the overall size of the packet, so that the size a packet transmitted/received over a radio channel can be reduced.

12 Claims, 20 Drawing Sheets

METHOD AND APPARATUS FOR TRANSMITTING/RECEIVING PACKET IN MOBILE COMMUNICATION SYSTEM

PRIORITY

This application claims priority under 35 U.S.C. §119(a) to applications entitled "Method and Apparatus for Transmitting/Receiving Packet in Mobile Communication System" filed in the Korean Industrial Property Office on May 2, 2006, Sep. 15, 2006 and Mar. 23, 2007, and assigned Serial Nos. 2006-039728, 2006-089677 and 2007-028910 respectively, the contents of which are hereby incorporated by reference.

BACKGROUND OF THE INVENTION

1. Field of the Invention

The present invention relates to a mobile communication system, and more particularly to a method and apparatus for transmitting/receiving an MAC (Media Access Control) packet in a mobile communication system.

2. Description of the Related Art

The UMTS (Universal Mobile Telecommunication Service) system is a $3^{rd}$ generation asynchronous mobile communication system which is based on European mobile communication systems, that is, GSM (Global System for Mobile Communications) and GPRS (General Packet Radio Services), and employing a WCDMA (Wideband Code Division Multiple Access) scheme.

The 3GPP ($3^{rd}$ Generation Partnership Project) responsible for the UMTS standardization is currently developing LTE (Long Term Evolution) as a next generation UMTS system. LTE, with an aim of commercialization by around 2010, is technology for implementing high-speed packet-based communication at data rates of about 100 Mbps. To this end, various plans are under discussion, including a plan to reduce the number of nodes located on a communication path by simplifying a network architecture, a plan to approximate wireless protocols to a radio channel as close as possible, and so forth.

FIG. 1 illustrates an example of the structure of a next generation mobile communication system. FIG. 1 illustrates a system structure based on the UMTS system.

Referring to FIG. 1, evolved radio access networks (hereinafter referred to as "E-RAN") 110 and 112 have a simplified two node structure of evolved Node Bs (hereinafter referred to as "ENB" or "Node B") 120, 122, 124, 126 and 128, and anchor nodes 130 and 132, as illustrated therein. User equipment (UE) 101 is connected to an internet protocol (IP) via the E-RANs 110 and 112.

The ENBs 120 to 128 corresponds to an existing Node B of the UMTS system, and is connected to the UE 101 over a radio channel. Unlike an existing Node B, the ENBs 120 to 128 perform more complex functions. In LTE, all user traffic, including a real-time service through an IP, such as a VoIP (Voice over IP) service, is serviced via a shared channel, and the ENB performs scheduling after collecting situation information of UEs.

In order to enable a maximum transmission speed of 100 Mbps, LTE is expected to employ an orthogonal frequency division multiplexing (OFDM) scheme as radio access technology with a bandwidth of 20 MHz. The LTE is also expected to apply an adaptive modulation and coding (AMC) scheme in which a modulation scheme and a channel coding rate are adaptively determined to the channel state of a UE.

Similar to HSDPA (High Speed Downlink Packet Access) or E-DCH (Enhanced-uplink Dedicated Channel), LTE uses HARQ (Hybrid Automatic Retransmission Request) between the ENBs 120 to 128 and the UE 101. However, since various levels of quality of service (QoS) requirements cannot be satisfied by the HARQ alone, an upper layer may perform a separate ARQ (outer-ARQ), which also takes place between the UE 101 and the ENBs 120 to 128.

FIG. 2 illustrates the structure of an LTE protocol.

As illustrated in FIG. 2, RLC (Radio Link Control) entities 220, 225, 230, 260, 265 and 270 are be established for each upper layer 205, 210, 215, 275, 280 and 285.

The RLC entity resizes upper layer data to an appropriate size, and performs an automatic retransmission request (ARQ) operation for the resized data. The data resized to an appropriate size by the RLC entity is referred to as an RLC protocol data unit (PDU).

In LTE, transmitting (Tx) RLC entities 220, 225 and 230 construct RLC PDUs 233 in such a manner as to have a size transmittable in an MAC (Media Access Control) layer at a corresponding point in time. Thus, the size of an RLC PDU 233 may vary with a channel situation, a resource allocation situation, or the like.

If a lower layer notifies a Tx RLC entity 220, 225 or 230 of the size of an RLC PDU to be transmitted in the next transmission time interval (TTI), the Tx RLC entity 220, 225 or 230 generates an RLC PDU by splitting or joining upper layer data in conformity with the notified size and inserting an RLC PDU header. The RLC PDU header may include serial number information, etc.

A Tx MAC entity 240 multiplexes RLC PDUs submitted from the Tx RLC entities 220, 225 and 230 to thereby generate an MAC PDU 243. Since RLC PDUs generated by several RLC entities may be multiplexed into one MAC PDU, multiplexing information for the RLC PDUs is inserted into an MAC PDU header. Information included in the MAC PDU header will be described in detail below with reference to FIG. 3.

The MAC PDU generated by the Tx MAC entity 240 passes through an HARQ process, and then is transmitted to a receiving side.

A packet actually transmitted over a radio channel is also referred to as a transport block 247. However, one MAC PDU is mapped to one transport block, that is, these two are different only in name and actually denote the same object. In the following description, a transport block and an MAC PDU will be used interchangeably.

For an HARQ operation, information necessary for transport block decoding is transmitted together with a separate control signal when a transport block 247 is transmitted from a Tx HARQ entity 245. This information includes information indicating the size a transport block (TB size) 249, information on an MCS (Modulation and Coding Scheme) applied to the transport block (MCS Info) 248, etc.

Since a transport block and an MAC PDU denote the same object, the information 249 indicating a TB size is not different from information indicating the size of an MAC PDU.

Upon successfully receiving a transport block 247, a receiving (Rx) HARQ entity 250 forwards an MAC PDU to an Rx MAC entity 255. The Rx MAC entity 255 separates an RLC PDU from the forwarded MAC PDU by using information included in an MAC PDU header, and forwards the separated RLC PDU to an appropriate Rx RLC entity 260, 265 or 270.

As discussed above, one of the important operations of an MAC layer is to multiplex RLC PDUs generated by several RLC entities into one MAC PDU and demultiplex RLC PDUs from an MAC PDU.

FIG. 3 illustrates the structure of an MAC PDU.

Referring to FIG. 3, upon receiving an RLC PDU from an RLC entity, a Tx MAC entity inserts a logical channel ID (LID) and a length (LEN) of the RLC PDU into an MAC PDU header.

Since one LID and one LEN per RLC PDU are inserted, as many LIDs and LENs as RLC PDUs are inserted when a plurality of RLC PDUs are multiplexed into one MAC PDU.

Information included in an MAC PDU header is usually located in the front of an MAC PDU, and thus LIDs and LENs match to RLC PDUs in their order within the header. In other words, the first LID 305 and the first LEN 310 within an MAC PDU header are information regarding the first RLC PDU 325, and the second LID 315 and the second LEN 320 are information regarding the second RLC PDU 330.

For a physical layer operation, the overall length of an MAC PDU is transferred to a receiving side through a separate control signal. Since the overall length of an MAC PDU is a value quantized according to given criteria, padding 335 may also be used in some cases. The padding refers to filling specific bits (usually 0) in remaining parts within a packet so as to achieve the byte-aligned length of a data packet when the data packet is generated.

In some cases, an LEN value indicating the length of an RLC PDU is unnecessary information because the overall length of an MAC PDU is given. For example, if only one RLC PDU is accommodated in an MAC PDU, it is highly probable that the length of the RLC PDU is equal to the length of the MAC PDU, excluding that of an MAC PDU header.

A VoIP packet consists of an IP/UDP/RTP header and a VoIP frame, the IP/UDP/RTP header is compressed to about 1 to 15 bytes through a header compression protocol called ROHC (Robust Header Compression), and the length of the VoIP frame is always constant within a given codec rate. In other words, the length of the VoIP packet remains within a certain range, and thus it is more efficient to use a predetermined value rather than absolute information, such as LEN. Since the length of an RLC PDU in LTE can contain several thousand bytes, an LEN field indicating the length of an RLC PDU has a length of about 10 bits. In contrast with this, since the maximum length of an RLC PDU accommodating a VoIP packet is only several tens of bytes, and the length of a frequently occurring packet can be predicted, it is possible to express most lengths by even small-sized information with a length of about 3 or 4 bits. If a VoIP operates by means of a codec with a variable codec rate, such as AMR (Adaptive Multi-Rate), the number of possible packet lengths significantly increases. Thus, an SID (Size Index), which is collapsed information indicating the length of an RLC PDU, may require many more bits. However, when an MAC PDU header for a VoIP is designed in such a manner that the size of an SID coincides with the operation of the AMR codec, it is possible that the length of the MAC PDU header becomes too large. In a high-speed communication system, such as LTE, an MAC PDU header is byte-aligned, and thus it is grossly inefficient to determine the size of an SID by taking all circumstances into consideration because a one or two-bit increase in the size of an SID may cause one-byte increase in the length of an MAC PDU header.

SUMMARY OF THE INVENTION

Accordingly, the present invention has been made to solve at least the above-mentioned problems occurring in the prior art, and the present invention provides a method and apparatus for reducing the length of an MAC PDU header by inserting information, which indicates the size of upper layer data included in an MAC PDU, into the MAC PDU header only when necessary.

Also, the present invention provides a method and apparatus for reducing the length of an MAC PDU header by inserting collapsed information indicating the length of an RLC PDU, that is, an SID, into an MAC PDU header for a service, the packet size of which is substantially constant, such as a VoIP.

In accordance with an aspect of the present invention, there is provided a method of transmitting a packet over a radio channel in a mobile communication system, the method includes receiving a first packet from an upper layer; generating a second packet by inserting a size index (SID) into a header, in addition to the first packet, the SID having a code point mapped to one of predetermined packet sizes or a code point indicating that a size of the first packet can be derived from a size of the second packet; and transmitting the generated second packet to a lower layer.

In accordance with another aspect of the present invention, there is provided a method of receiving a packet over a radio channel in a mobile communication system, the method includes receiving a second packet from a lower layer, the second packet including a size index (SID) which has a code point mapped to one of predetermined packet sizes or a code point indicating that a size of a first packet can be derived from a size of the second packet; calculating the size of the first packet included in the second packet according to the SID; extracting the first packet from the second packet by using the calculated size; and forwarding the extracted first packet to an upper layer according to identification information included in a header of the second packet.

In accordance with yet another aspect of the present invention, there is provided a method of transmitting a packet over a radio channel in a mobile communication system, the method includes multiplexing first packets, which are received from an upper layer, into a second packet; determining the number of the first packets accommodated in the second packet; determining if padding exists in the second packet when it is determined that the number of the first packets is one; generating the second packet without inserting information indicating a size of the first packet into a header of the second packet when it is determined that the padding does not exist, and generating the second packet by inserting the information indicating sizes of the first packets into the header of the second packet when it is determined that the number of the first packets is two or more, or when it is determined that the padding exists; and transmitting the generated second packet to a lower layer.

In accordance with still yet another aspect of the present invention, there is provided a method of receiving a packet over a radio channel in a mobile communication system, the method includes receiving from a lower layer a second packet, into which one or more first packets are multiplexed; analyzing a header of the second packet; separating the first packets from the second packet by using information indicating sizes of the first packets when the information is included in the header of the second packet, and separating the first packets from the second packet by using sizes of the first packets, which are calculated from a size of the second packet and a size of the header of the second packet, when the information is not included in the header of the second packet; and forwarding the separated first packets to an upper layer according to identification information included in the header of the second packet.

In accordance with still yet another aspect of the present invention, there is provided a method of transmitting a packet over a radio channel in a mobile communication system, the method includes multiplexing first packets, which are received from an upper layer, into a second packet; determining if padding exists in the second packet; generating the second packet by inserting information indicating sizes of the first packets excluding a last one thereof into a header of the second packet when it is determined that the padding does not exist, and generating the second packet by inserting information indicating sizes of all the first packets into the header of the second packet when it is determined that the padding exists; and transmitting the generated second packet to a lower layer.

In accordance with still yet another aspect of the present invention, there is provided a method of receiving a packet over a radio channel in a mobile communication system, the method includes receiving a second packet, into which one or more first packets are multiplexed, from a lower layer; determining if information indicating sizes of all the first packets multiplexed into the second packet is included in a header of the second packet; separating the first packets from the second packet by using the information when it is determined that the information is included in the header of the second packet; calculating a size of a last one of the first packets by using a size of the second packet, a size of the header of the second packet, and sizes of the first packets excluding the last one when it is determined that information indicating the size of the last one is not included in the header of the second packet, and separating the first packets from the second packet by using the sizes of the first packets; and forwarding the separated first packets to an upper layer according to identification information included in the header of the second packet.

In accordance with still yet another aspect of the present invention, there is provided an apparatus for transmitting a packet over a radio channel in a mobile communication system, the apparatus includes a first packet generation unit for generating a first packet; a data part construction unit for constructing a data part from the generated first packet; a header insertion unit for generating a second packet by inserting a header into the data part; a processor for transmitting the generated second packet; and a control unit for determining a size of the first packet, transferring the determined size to the first packet generation unit, and controlling the header insertion unit to insert size information of the first packet into the header according to the size of the first packet and a size of the second packet, wherein the control unit controls the header insertion unit to insert a size index (SID) as the size information of the first packet into the header, in addition to the first packet, the SID having a code point mapped to one of predetermined packet sizes or a code point indicating that the size of the first packet can be derived from the size of the second packet.

In accordance with still yet another aspect of the present invention, there is provided an apparatus for transmitting a packet over a radio channel in a mobile communication system, the apparatus includes a first packet generation unit for generating a first packet; a data part construction unit for constructing a data part from the generated first packet; a header insertion unit for generating a second packet by inserting a header into the data part; a processor for transmitting the generated second packet; and a control unit for determining a size of the first packet, transferring the determined size to the first packet generation unit, and controlling the header insertion unit to insert size information of the first packet into the header according to the size of the first packet and a size of the second packet, wherein when only one first packet is accommodated in the second packet, the control unit controls the header insertion unit not to insert the size information of the first packet, but to insert a field, which indicates that the only one first packet is accommodated in the second packet, into the header.

In accordance with still yet another aspect of the present invention, there is provided an apparatus for transmitting a packet over a radio channel in a mobile communication system, the apparatus includes a first packet generation unit for generating a first packet; a data part construction unit for constructing a data part from the generated first packet; a header insertion unit for generating a second packet by inserting a header into the data part; a processor for transmitting the generated second packet; and a control unit for determining a size of the first packet, transferring the determined size to the first packet generation unit, and controlling the header insertion unit to insert size information of the first packet into the header according to the size of the first packet and a size of the second packet, wherein when a plurality of the first packets are accommodated in the second packet, and a last byte of a last one of the first packets corresponds to a last byte of the second packet, the control unit controls the header insertion unit not to insert size information of the last one of the first packets, but to insert a field, which indicates that the last bytes correspond to each other, into the header.

In accordance with still yet another aspect of the present invention, there is provided an apparatus for receiving a packet over a radio channel in a mobile communication system, the apparatus includes a processor for receiving a radio signal and demodulating the received radio signal into a second packet including one or more first packets; a header analysis unit for calculating sizes of the first packets from a size index (SID) included in a header of the second packet, and extracting a header part and a data part from the second packet by using the calculated sizes, the SID having a code point mapped to one of predetermined packet sizes or a code point indicating that the sizes of the first packets can be derived from a size of the second packet; and a first packet separation unit for receiving the header part and the data part from the header analysis unit, extracting the first packets from the data part by using the header analyzed by the header analysis unit, and forwarding the extracted first packets to an upper layer.

In accordance with still yet another aspect of the present invention, there is provided an apparatus for receiving a packet over a radio channel in a mobile communication system, the apparatus includes a processor for receiving a radio signal and demodulating the received radio signal into a second packet including one or more first packets; a header analysis unit for calculating sizes of the first packets by referencing a value of a field included in a header of the second packet, and extracting a header part and a data part from the second packet by using the calculated sizes, the field indicating a number of the first packets accommodated in the second packet; and a first packet separation unit for receiving the header part and the data part from the header analysis unit, extracting the first packets from the data part by using the header analyzed by the header analysis unit, and forwarding the extracted first packets to an upper layer.

In accordance with still yet another aspect of the present invention, there is provided an apparatus for receiving a packet over a radio channel in a mobile communication system, the apparatus includes a processor for receiving a radio signal and demodulating the received radio signal into a second packet including one or more first packets; a header analysis unit for calculating sizes of the first packets by referencing a value of a field included in a header of the second packet, and extracting a header part and a data part from the second packet by using the calculated sizes, the field indicating that a plurality of the first packets are accommodated in the second packet, and a last byte of a last one of the first packets corresponds to a last byte of the second packet; and a first packet separation unit for receiving the header part and the data part from the header analysis unit, extracting the first packets from the data part by using the header analyzed by the header analysis unit, and forwarding the extracted first packets to an upper layer.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE PREFERRED EMBODIMENT

Figure 1:
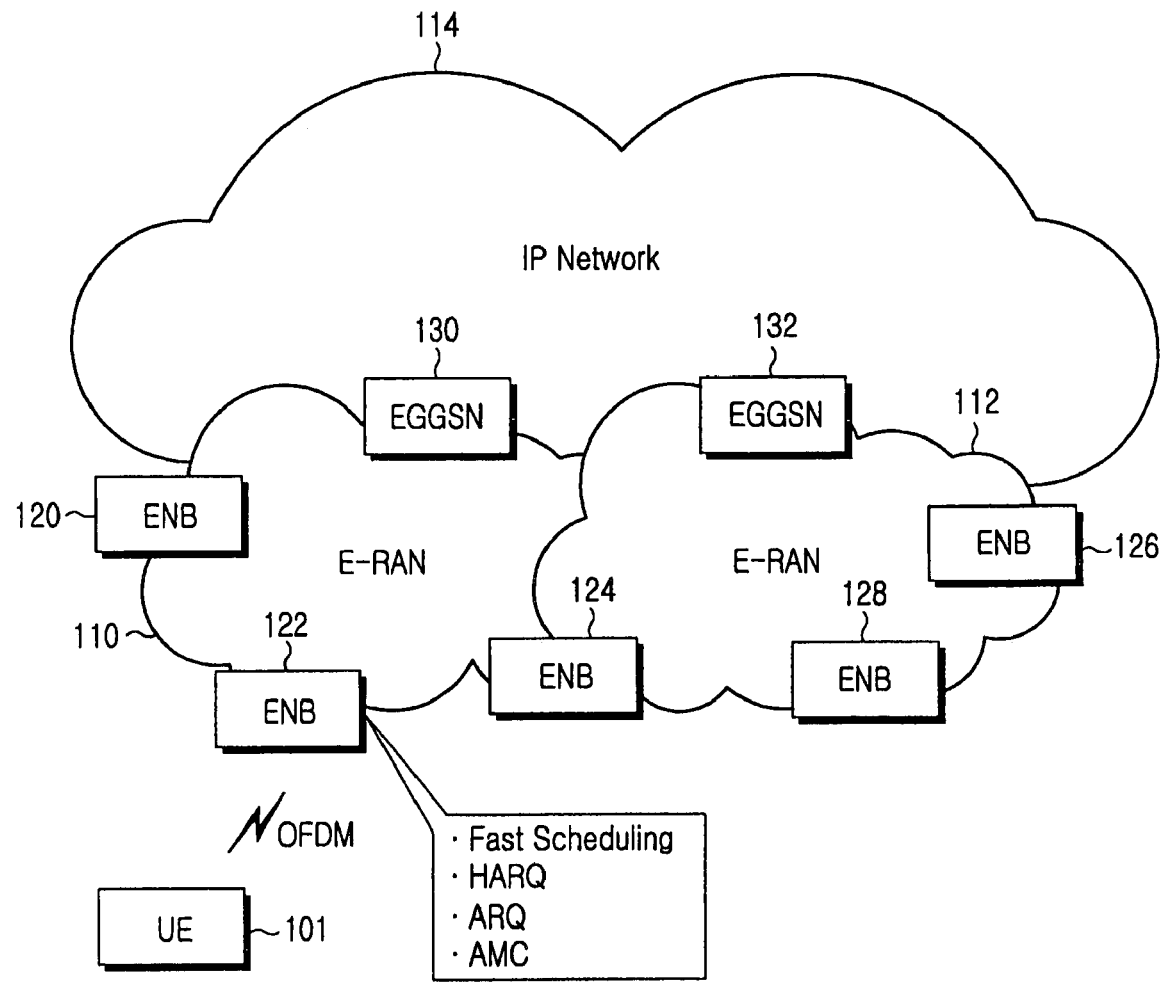
FIG. 1 is a diagram illustrating an example of the structure of a next mobile communication system.
Figure 2:
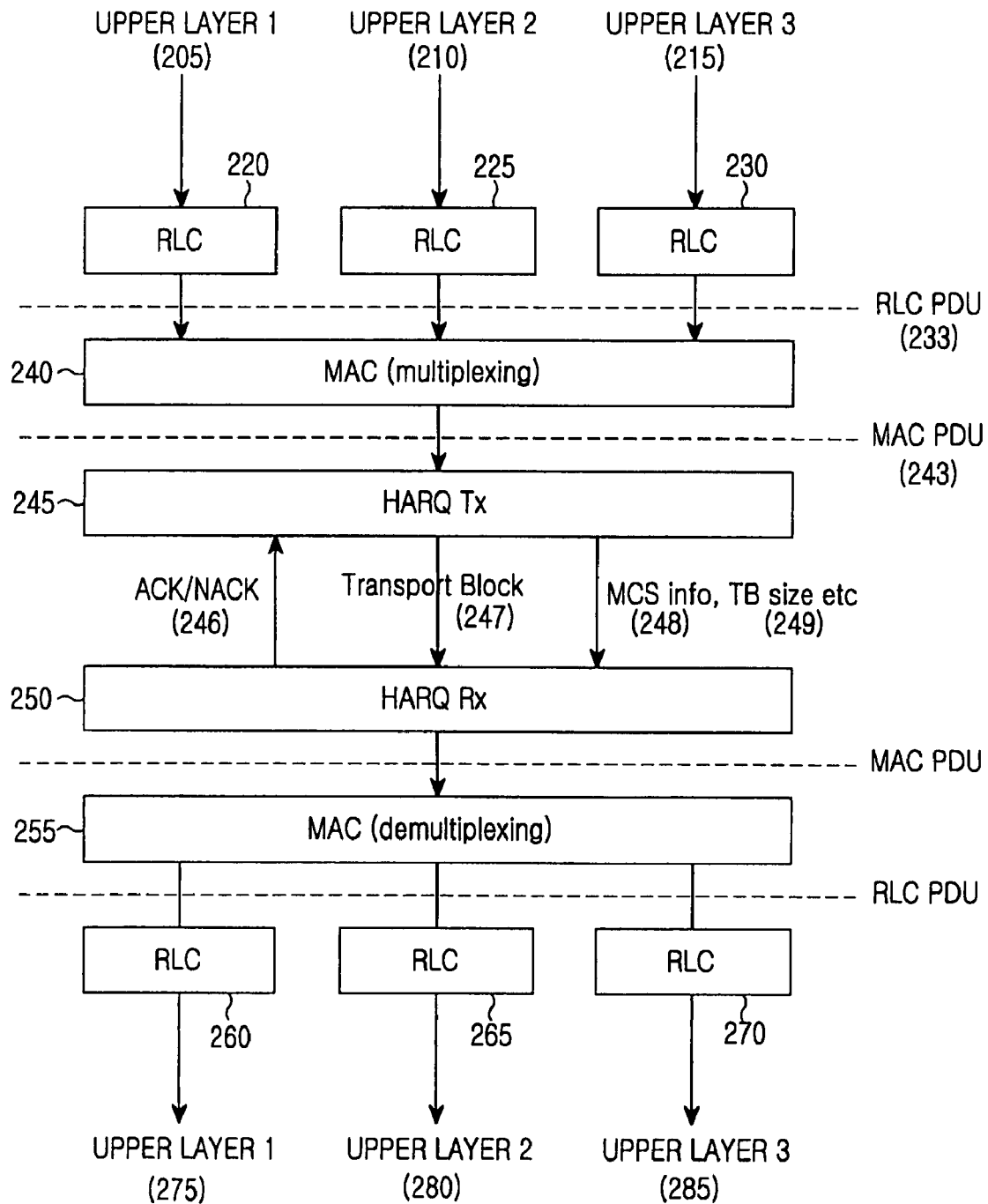
FIG. 2 is a diagram illustrating the structure of a protocol of a next generation mobile communication system.
Figure 3:
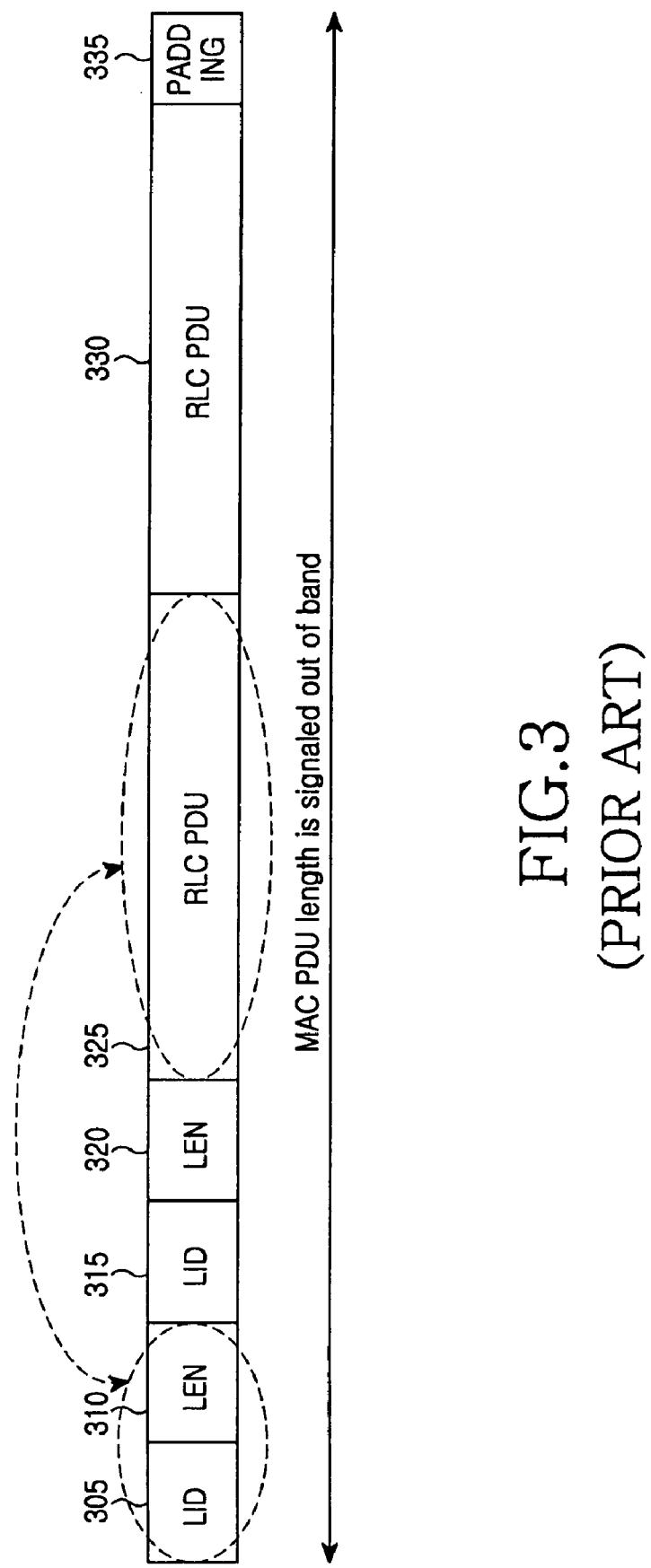
FIG. 3 is a diagram illustrating the structure of an MAC PDU of a next generation mobile communication system.

Hereinafter, preferred embodiments of the present invention will be described with reference to the accompanying drawings. It should be noted that the similar components are designated by similar reference numerals although they are illustrated in different drawings. Also, in the following description, a detailed description of known functions and configurations incorporated herein will be omitted when it may obscure the subject matter of the present invention. Further, it should be noted that only parts essential for understanding the operations according to the present invention will be described and a description of parts other than the essential parts will be omitted in order not to obscure the gist of the present invention.

In the specification, the terms "MAC PDU" and "RLC PDU" will appear frequently. As used herein, the term "MAC PDU" means a data unit into which data units of an upper layer are multiplexed by a layer responsible for multiplexing, and the term "RLC PDU" means a data unit provided by an upper unit of the layer responsible for multiplexing.

In LTE, since a receiving side knows the size of an MAC PDU through separate control information, size information of an RLC PDU accommodated in the MAC PDU does not need to be included in a header when the length of the RLC PDU can be deduced from the size of the MAC PDU.

This is obviously the case where only one RLC PDU is accommodated in an MAC PDU, and the length of the RLC PDU is equal to the size of the MAC PDU excluding a header thereof.

Embodiment 1

In a first embodiment of the present invention, a Tx MAC entity does not include information indicating the size of an upper layer data unit (or RLC PDU) in an MAC PDU header if the following two conditions are satisfied:

only one upper layer data unit (or RLC PDU) is accommodated in an MAC PDU, and the size of the upper layer data unit (or RLC PDU) is equal to the size of an MAC PDU excluding the MAC PDU header, that is, padding is not affixed to the rear portion of an MAC PDU, and the last byte of the upper layer data unit corresponds to that of the MAC PDU.

Since an RLC layer variably sets the length of an RLC PDU, the second condition is satisfied when data, the amount of which is greater than the size of an MAC PDU, is stored in an RLC buffer.

Figure 4:
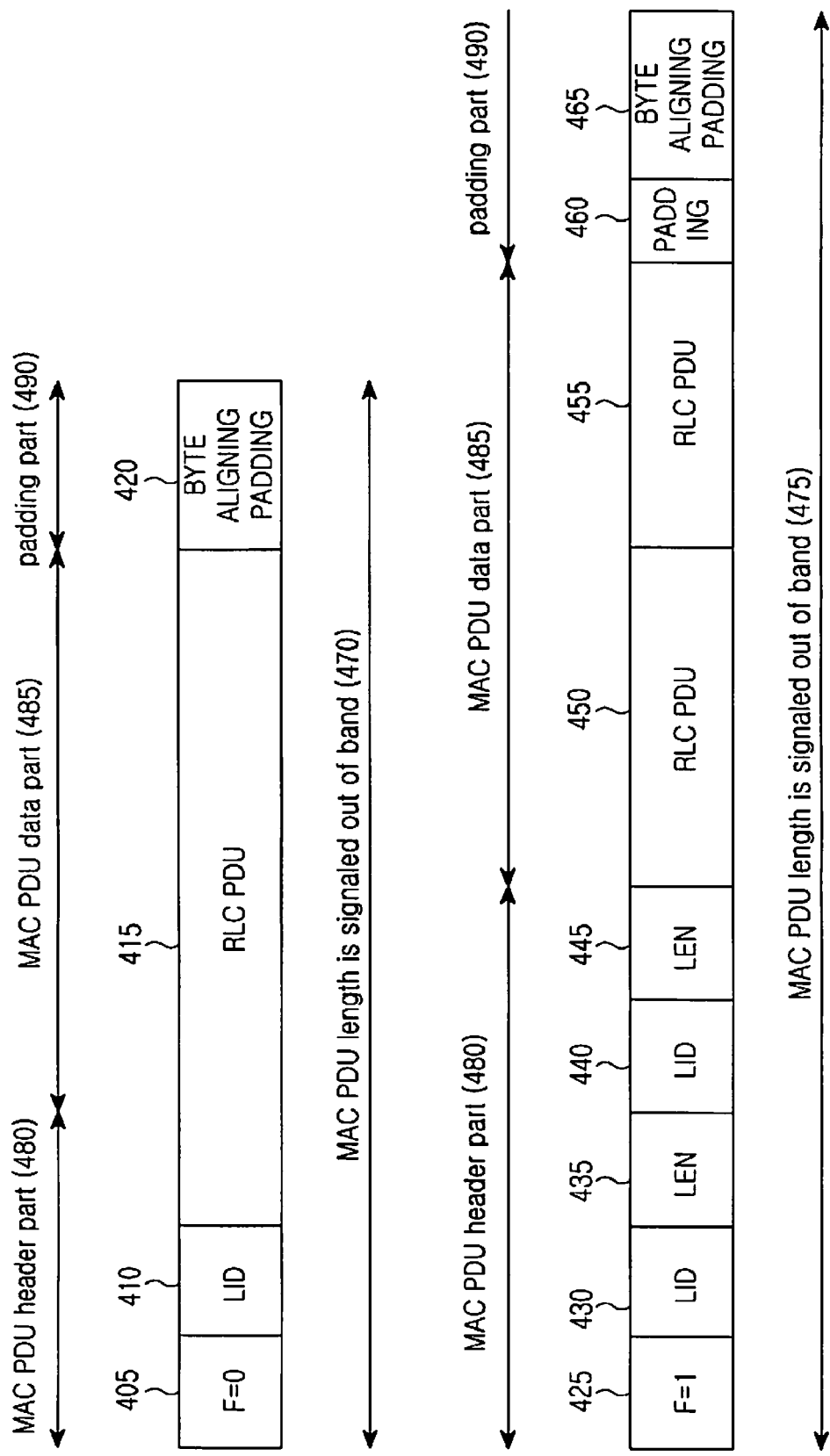
FIG. 4 is a diagram illustrating the structure of an MAC PDU in accordance with a first embodiment of the present invention.

FIG. 4 illustrates the structure of an MAC PDU according to the first embodiment of the present invention.

Referring to FIG. 4, an MAC PDU header 480 includes F fields 405 and 425, LID fields 410, 430 and 440, and LEN fields 435 and 445. Although not illustrated in the drawing, other fields may be included in the MAC PDU header, if necessary.

RLC PDUs 415, 450 and 455 are located next to the MAC PDU header, and general padding 460 or byte aligning padding 420 and 465 for byte-aligning the MAC PDU is located next to the RLC PDUs.

In the present invention, the MAC PDU is divided into three parts, that is, an MAC PDU header part 480, an MAC PDU data part 485, and a padding part 490.

The MAC PDU header part 480 is a space in which the F, LID and LEN fields are accommodated. The MAC PDU data part 485 is a space in which upper layer data units, such as RLC PDUs, are accommodated. The padding part 490 is a space in the rear of the MAC PDU, which is filled with dummy bits when the size of the MAC PDU does not correspond to the sum of the sizes of the MAC PDU header part, the MAC PDU data part and the padding part.

The respective elements of the MAC PDU header part 480, the MAC PDU data part 485 and the padding part 490 will be described in detail.

The F fields 405 and 425 contain 1-bit information.

If the F field has a value of 0 (F field 405), only one RLC PDU 415 is accommodated in the MAC PDU data part 485. Further, since the MAC PDU data part is filled with the RLC PDU as fully as possible, byte aligning padding 420 may exist in the padding part 490, but general padding does not exist. In addition, an LEN field indicating the length of the RLC PDU does not exist in the MAC PDU header part 480.

If the F field has a value of 1 (F field 425), LEN fields 435 and 445 indicating the lengths of RLC PDUs exist in the MAC PDU header part 480.

The LID fields 410, 430 and 440 includes the identifier of a logical channel to which an RLC PDU belongs or the identifier of an RLC entity in which an RLC PDU occurs. An Rx MAC entity forwards a corresponding RLC PDU to an appropriate RLC entity by making reference to the LID field.

The LEN fields 435 and 445 are fields indicating the length of an RLC PDU. In the present invention, although it is assumed that the length of an RLC PDU is expressed in units of bytes, other units may be used.

The RLC PDUs 415, 450 and 455 means upper layer data of an MAC layer. An RLC layer generates an RLC PDU framed in an appropriate size under instructions from an MAC layer, and then submits it to the MAC layer.

The byte aligning padding 420 and 465 are dummy data for correcting a difference between the size of an MAC PDU, signaled through a control channel, and the actual size of the MAC PDU, and has a size of 0 bit to 7 bits.

The size of an MAC PDU, signaled through a control channel, is in units of bits, and the size of an MAC PDU header is most likely to be in units of bits. However, since the length of an RLC PDU is in units of bytes, the sum of the sizes of an MAC PDU header (in bits) and RLC PDUs (in bytes) may not correspond to the size of an MAC PDU, signaled through a control channel. For example, when the size of an MAC PDU, signaled through a control channel, is 250 bits, the size of an MAC PDU header is 7 bits, and the length of an RLC PDU is 30 bytes, there is a difference of 3 bits between the actual size of the MAC PDU and the size of the MAC PDU, signaled through a control channel.

In this way, if a part constituting an MAC PDU has a size in units of bytes when the size of the MAC PDU is signaled in units of bits, padding between 0 bit and 7 bits unavoidably occurs. In the specification, such padding occurring within 1 byte is referred to as "byte aligning padding".

Since the byte aligning padding always has a value of 0 bit to 7 bits, and can be deduced by subtracting the sizes of an RLC PDU and an MAC PDU header from the overall size of an MAC PDU, it is not necessary to separately signal whether or not the byte aligning padding exists.

There is a case where general padding is used in addition to byte aligning padding. For example, when the size of a transmittable MAC PDU is greater than that of data stored in an RLC buffer, the size of an MAC PDU must be adjusted to the size of the transmittable MAC PDU by filling dummy data. As an example, if the size of an MAC PDU to be transmitted at any point in time is 1000 bits, but the total sum of the sizes of data stored in an RLC buffer is only 500 bits, the remaining 500 bits of the MAC PDU must be filled with padding 460. In the following description, the general padding will be referred to as "padding", and the byte aligning padding will be referred to as "byte aligning padding" in its entirety.

In the first embodiment of the present invention, the structure of an MAC PDU header varies with the value of an F field.

When the F field has a value of 0, that is, when only one RLC PDU is accommodated in an MAC PDU, general padding does not exist, and only byte aligning padding exists, an LEN field is not inserted into an MAC PDU header.

When the F field has a value of 1, that is, when a plurality of RLC PDUs are accommodated in an MAC PDU or when only one RLC PDU is accommodated in an MAC PD U, and yet general padding exists, LEN fields are inserted into an MAC PDU header.

Figure 5:
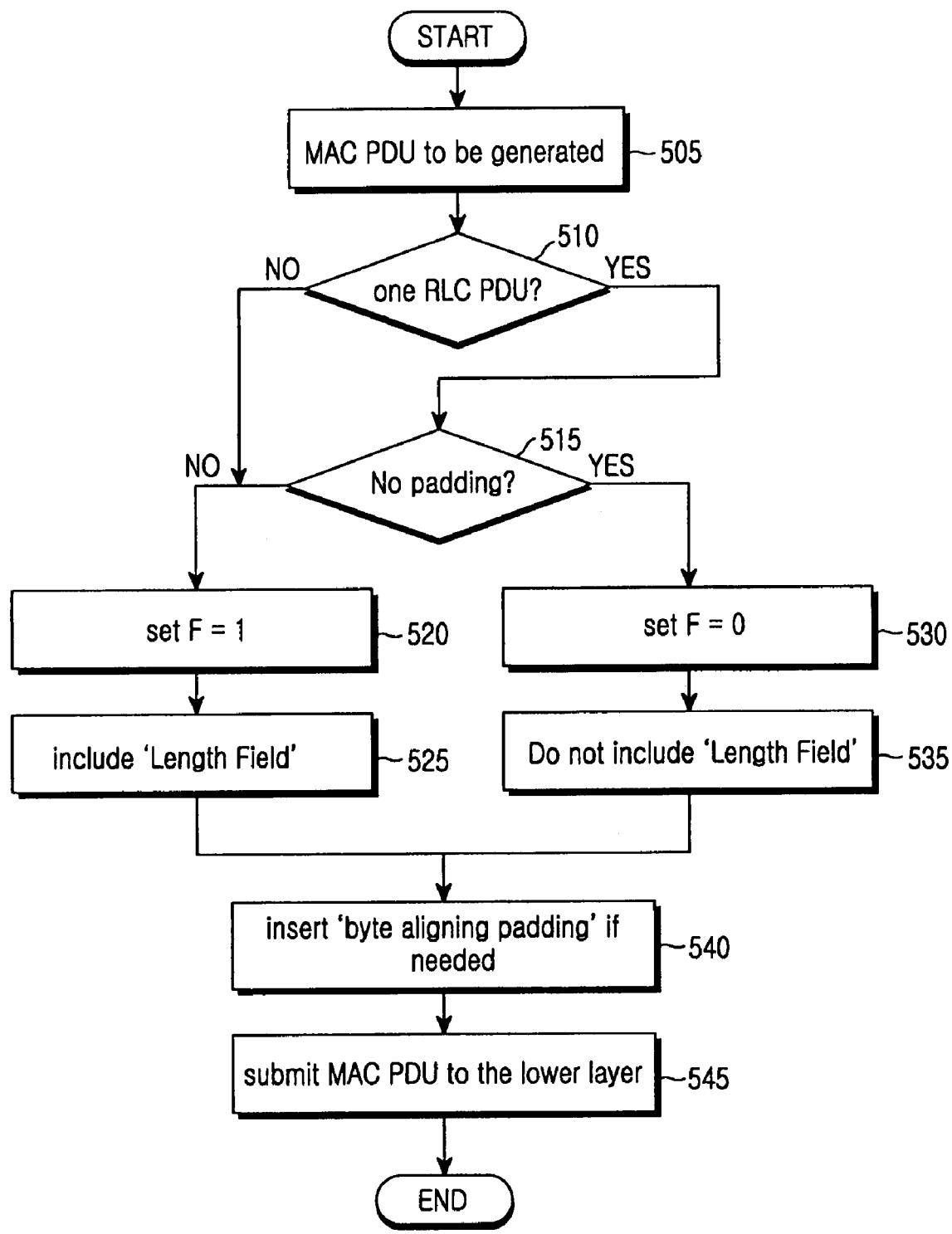
FIG. 5 is a flowchart for explaining the operation of a transmitting apparatus in accordance with the first embodiment of the present invention.

FIG. 5 illustrates the operation of a Tx MAC entity according to the first embodiment of the present invention.

Referring to FIG. 5, in step 505, the Tx MAC entity begins to generate an MAC PDU. That is, if a base station scheduler allocates transmission resources to the Tx MAC entity, the Tx MAC entity determines RLC entities, which are to transmit data through the transmission resources, by considering the priorities of the RLC entities, etc. Further, the Tx MAC entity determines the amount of data to be transmitted by each of the RLC entities, and instructs each of the RLC entities to generate an RLC PDU having a size corresponding to the determined amount. If RLC PDUs arrive from the RLC entities, the Tx MAC entity multiplexes the RLC PDUs into an MAC PDU.

In step 510, the Tx MAC entity determines the number of the RLC PDUs accommodated in the MAC PDU, the generation of which is in progress.

If it is determined that only one RLC PDU is accommodated in the MAC PDU, the Tx MAC entity proceeds to step 515, and otherwise proceeds to step 520. Only one RLC PDU is accommodated in the MAC PDU when there is only one RLC entity having data to be transmitted at a corresponding point in time, only data possessed by an RLC entity with the highest priority is transmitted because the amount of allocated transmission resources is insufficient, and so forth.

In step 515, the Tx MAC entity determines if the MAC PDU, the generation of which is in progress, satisfies the following conditions: the Tx MAC entity determines (1) if there is no padding because the length of the RLC PDU is sufficiently large, (2) if the last byte of the RLC PDU corresponds to that of the MAC PDU, or (3) if the length of the RLC PDU is equal to a value obtained by subtracting the sizes of an MAC PDU header and byte aligning padding from the size of the MAC PDU.

The Tx MAC entity proceeds to step 530 if any one of the conditions is satisfied, and proceeds to step 520 if none of the conditions are satisfied.

In step 520, the Tx MAC entity sets the value of an F field to 1, and then proceeds to step 525. In step 525, the Tx MAC entity inserts LEN fields, each indicating the length of each of the RLC PDUs, into the MAC PDU header, and then proceeds to step 540.

In step 530, the Tx MAC entity sets the value of an F field to 0, and then proceeds to step 540 via step 535 in which the Tx MAC entity does not insert an LEN field indicating the length of the RLC PDU into the MAC PDU header.

In step 540, the Tx MAC entity inserts byte aligning padding into the rear portion of the MAC PDU to thereby complete the MAC PDU, and then proceeds to step 545. In step 545, the Tx MAC entity submits the completed MAC PDU to a lower layer.

Figure 6:
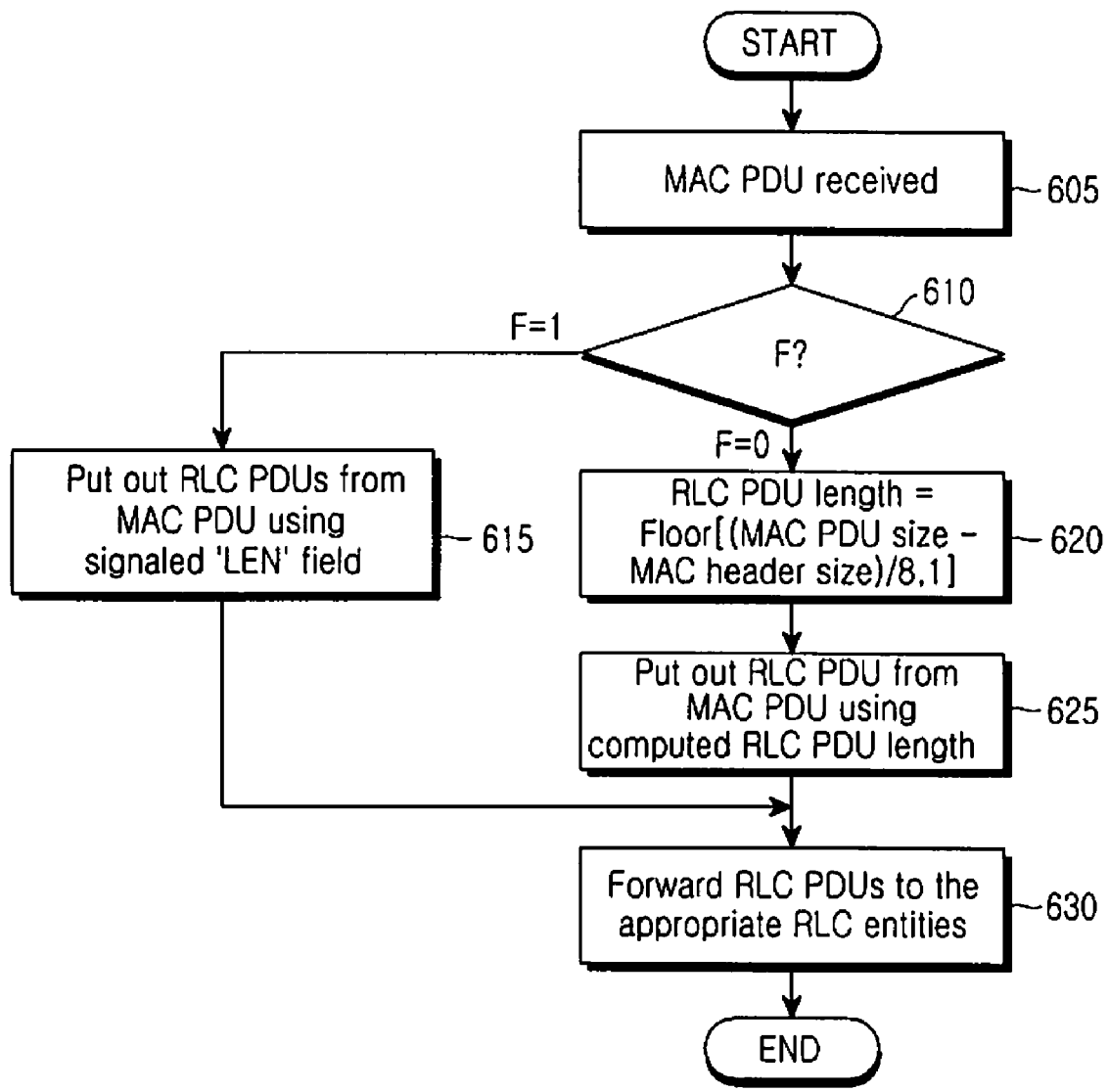
FIG. 6 is a flowchart for explaining the operation of a receiving apparatus in accordance with the first embodiment of the present invention.

FIG. 6 illustrates the operation of an Rx MAC entity according to the first embodiment of the present invention.

Referring to FIG. 6, if the Rx MAC entity receives an MAC PDU from a lower layer in step 605, the Rx MAC entity determines the value of an F field in step 610. The Rx MAC entity proceeds to step 620 if it is determined that the F field has a value of 0, and proceeds to step 615 if it is determined that the F field has a value of 1.

In step 615, the Rx MAC entity separates RLC PDUs from the MAC PDU by using the values of LEN fields accommodated in an MAC PDU header.

The following is a process of separating the RLC PDUs from the MAC PDU.

First, the Rx MAC entity identifies a point where a header part and a data part of the MAC PDU are separated from each other. That is, the Rx MAC entity sequentially analyzes LEN fields in the MAC PDU header part, and repeatedly subtracts the size corresponding to the LEN field from the overall size of the MAC PDU. If the remaining size of the MAC PDU after the repeated subtractions is less than the minimum size of RLC PDUs, the Rx MAC entity recognizes a corresponding LEN as the last LEN field.

The Rx MAC entity separates the MAC PDU header part from the MAC PDU data part on the basis of the last LEN field, separates the RLC PDUs from the MAC PDU data part by making reference to the LEN fields in the MAC PDU header part, and then proceeds to step 630.

In step 630, the Rx MAC entity forwards the RLC PDUs to appropriate RLC entities by making reference to the values of LID fields in the MAC PDU header part.

The fact that the F field has a value of 0 means that only one RLC PDU is accommodated in the MAC PDU, the RLC PDU fills the MAC PDU up to its last byte, and an LEN field indicating the length of the RLC PDU is not included in the MAC PDU header. Thus, in step 620, the Rx MAC entity calculates the length of the RLC PDU by using Equation (1):

$$\text{RLC PDU length}=\text{Floor}[(\text{MAC PDU size}-\text{MAC header size})/8,1] \quad (1)$$

In Equation (1), the function Floor[x, y] is defined as an integer obtained by rounding down x by the nearest multiple of y.

Further, the MAC PDU size denotes the overall size of a received MAC PDU, which is signaled through a separate control channel. In Equation (1), it is assumed that the overall size of the MAC PDU is signaled in units of bits.

Further, the MAC header size denotes the size of an MAC PDU header, expressed in bits. When only one RLC PDU is accommodated in an MAC PDU, and the RLC PDU fills the MAC PDU up to its last byte, the MAC PDU header does not include an LEN field, and consists of only an LID field and other fields. Thus, the size of the MAC PDU header corresponds to the sum of sizes of the LID field and other fields.

As with Equation (1), if the MAC header size is subtracted from the MAC PDU size, the size of a space in which the RLC PDU can be accommodated is calculated. However, since the length of the RLC PDU is in units of bytes, the value obtained by subtracting the MAC header size from the MAC PDU size must be divided by 8 and the quotient of the division must be taken in order to express the length of the RLC PDU in units of bytes.

If the overall size of the MAC PDU is signaled in units of bytes, the length of the RLC PDU can be derived from Equation (2):

$$\text{RLC PDU length}=\text{Floor}[(\text{MAC PDU size}*8-\text{MAC header size})/8,1] \quad (2)$$

Upon deriving the length of the RLC PDU in step 620, in step 625, the Rx MAC entity separates the RLC PDU from the MAC PDU by making reference to the derived length of the RLC PDU. That is, the Rx MAC entity takes a portion corresponding to the length of the RLC PDU from the point where the MAC PDU data part starts.

Subsequently, the Rx MAC entity proceeds to step 630, and forwards the RLC PDU to an appropriate RLC entity by making reference to an LID field in the MAC PDU header part.

According to the first embodiment of the present invention, as stated above, a header field indicating the length of an RLC PDU can be omitted when only one RLC PDU is accommodated in an MAC PDU.

Embodiment 2

A second embodiment of the present invention proposes a way to omit an LEN field indicating the size of the last RLC PDU when two or more RLC PDUs are accommodated in an MAC PDU.

The second embodiment of the present invention is based on the fact that when general padding, other than byte aligning padding, does not exist in a padding part of an MAC PDU, the size of the last RLC PDU is equal to a value obtained by subtracting the sizes of an MAC PDU header and other RLC PDUs from the overall size of the MAC PDU.

Unlike the first embodiment, since an MAC PDU header part and an MAC PDU data part cannot be identified from each other even when LEN values in the MAC PDU header part are analyzed, the MAC PDU header and data parts are identified using a separate flag in the second embodiment of the present invention.

The flag used for identifying the MAC PDU header and data parts from each other will be named an E field for the convenience of explanation.

In the second embodiment of the present invention, a Tx MAC entity does not include an LEN field indicating the size of the last upper layer data unit (or RLC PDU) in an MAC PDU header if the following two conditions are satisfied:

information indicating the size of the last upper layer data unit (or RLC PDU) is omitted in the MAC PDU header; and the last byte of the last upper layer data unit (or RLC PDU) corresponds to that of an MAC PDU.

Figure 7:
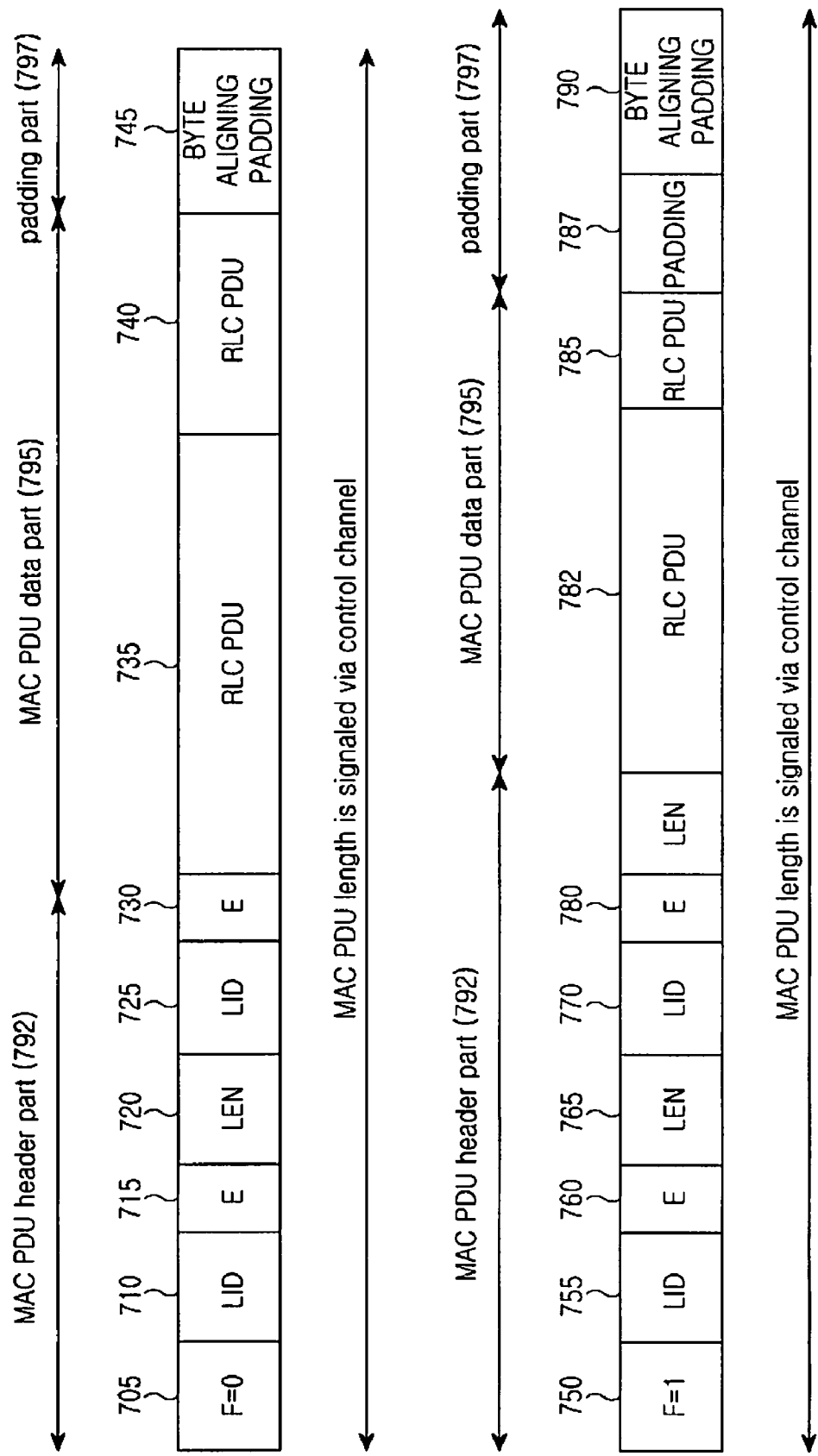
FIG. 7 is a diagram illustrating the structure of an MAC PDU in accordance with a second embodiment of the present invention.

FIG. 7 illustrates the structure of an MAC PDU according to the second embodiment of the present invention.

Referring to FIG. 7, an MAC PDU header 792 includes F fields 705 and 750, LID fields 710, 725, 755 and 770, LEN fields 720, 765 and 780, and E fields 715, 730, 760 and 775. Although not illustrated in the drawing, other fields may be included in the MAC PDU header part, if necessary.

RLC PDUs 735, 740, 782 and 785 are located next to the MAC PDU header, and padding 787 or byte aligning padding 745 and 790 is located next to the RLC PDUs.

The F fields 705 and 725 contain 1-bit information.

If the F field has a value of 0 (F field 705), padding other than the byte aligning padding 745 does not exist in a padding part 797 because the last RLC PDU accommodated in the MAC PDU fills the MAC PDU data part up to its last byte.

Further, an LEN field indicating the length of the last RLC PDU does not exist in the MAC PDU header part 792.

If the F field has a value of 1 (F field 750), LEN fields 765, 780 indicating the lengths of all RLC PDUs including the last RLC PDU exist in the MAC PDU header.

A repetitive description of the LID, LEN, RLC PDU, padding and byte aligning padding fields will be omitted because they have been already described in connection with the first embodiment.

The E fields 715, 760, 775 contain 1-bit information.

If the E field has a value of 0, a new set of LID, E and LEN fields does not exist any longer. Thus, in the case of an MAC PDU including an F field whose value is 0, an MAC PDU data part starts directly after the E field. In the case of an MAC PDU including an F field whose value is 1, an LEN field is located next to the E field, and an MAC PDU data part starts next to the LEN field.

If the E field has a value of 1, another set of LID, E and LEN fields exists. That is, an LEN field is located next to the E field, and a new set of LID, E and LEN fields exist next to the LEN field.

In the second embodiment of the present invention, the structure of an MAC PDU header varies with the value of an F field.

When the F field has a value of 0, that is, when padding does not exist in the padding part 797 of an MAC PDU, but only byte aligning padding exists, an LEN field for the last RLC PDU is not inserted into an MAC PDU header.

When the F field has a value of 1, that is, when, in addition to byte aligning padding 790, padding 787 also exists in a padding part 797 of an MAC PDU, an LEN field 780 for the last RLC PDU is also inserted into an MAC PDU header.

Figure 8:
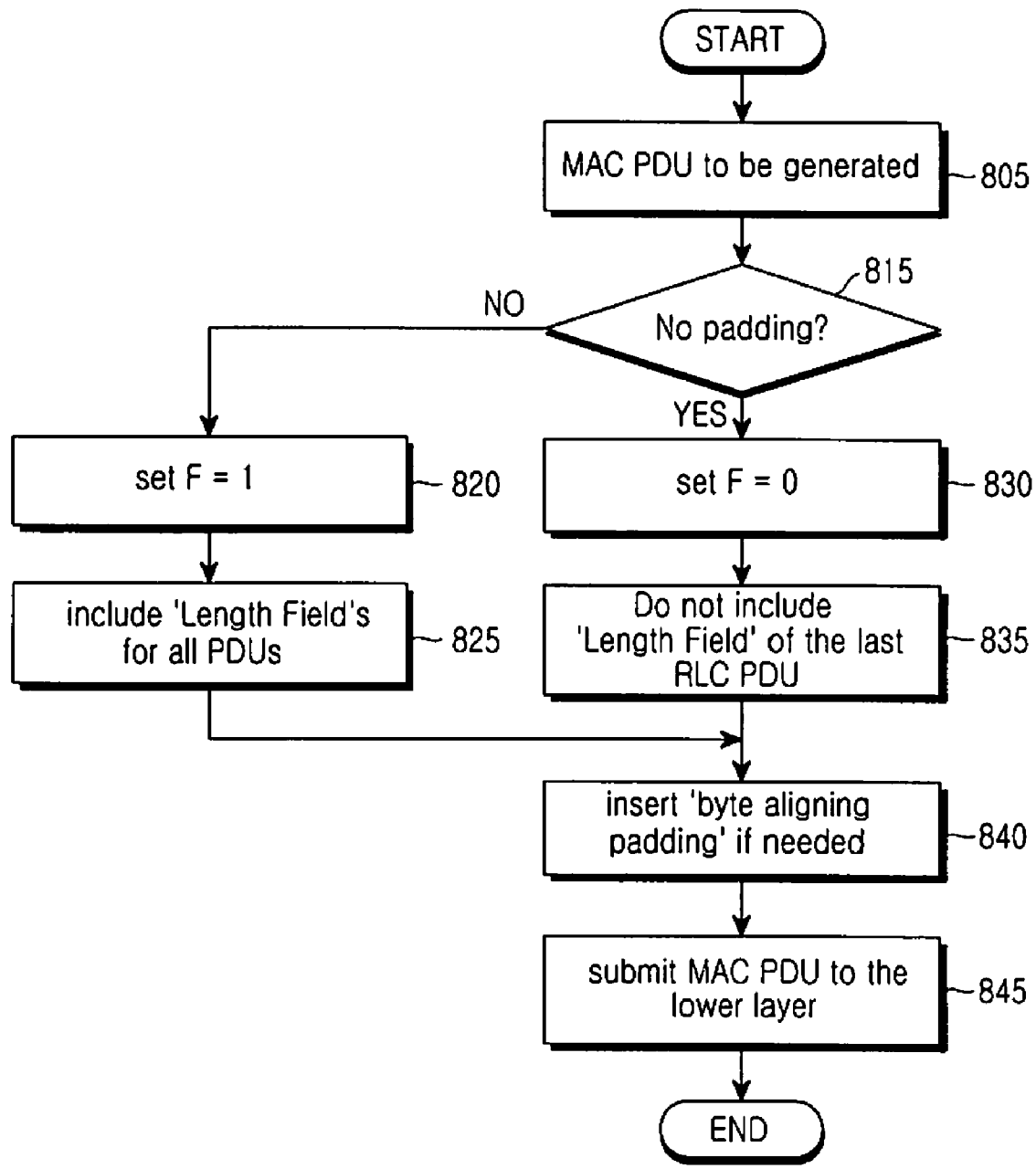
FIG. 8 is a flowchart for explaining the operation of a transmitting apparatus in accordance with the second embodiment of the present invention.

FIG. 8 illustrates the operation of a Tx MAC entity according to the second embodiment of the present invention.

Referring to FIG. 8, in step 805, the Tx MAC entity begins to generate an MAC PDU. That is, if a base station scheduler allocates transmission resources to the Tx MAC entity, the Tx MAC entity determines the RLC entities, which are to transmit data through the transmission resources, by considering the priorities of the RLC entities, etc. Further, the Tx MAC entity determines the amount of data to be transmitted by each of the RLC entities, and instructs each of the RLC entities to generate an RLC PDU having a size corresponding to the determined amount. If RLC PDUs arrive from the RLC entities, the Tx MAC entity multiplexes the RLC PDUs into an MAC PDU.

In step 815, the Tx MAC entity determines if the MAC PDU, the generation of which is in progress, satisfies the following conditions: the Tx MAC entity determines (1) if there is no padding because the size of the last RLC PDU is sufficiently large, (2) if the last byte of the RLC PDU corresponds to that of the MAC PDU, or (3) if the length of the RLC PDU is equal to a value obtained by subtracting the sizes of an MAC PDU header, the RLC PDUs excluding the last RLC PDU, and byte aligning padding from the size of the MAC PDU.

The Tx MAC entity proceeds to step 830 if any one of the conditions is satisfied, and otherwise proceeds to step 820.

In step 820, the Tx MAC entity sets the value of an F field to 1, and then proceeds to step 825. In step 825, the Tx MAC entity inserts a number of LEN fields equal to the number of the RLC PDUs, accommodated in the MAC PDU, into the MAC PDU header, and then proceeds to step 840. Here, each of the inserted LEN fields indicates the length of each of the RLC PDUs.

In step 830, the Tx MAC entity sets the value of an F field to 0, and then proceeds to step 840 via step 835 in which the Tx MAC entity inserts LEN fields indicating the lengths of the RLC PDUs excluding the last RLC PDU into the MAC PDU header.

In step 840, the Tx MAC entity inserts byte aligning padding into the rear portion of the MAC PDU to thereby complete the MAC PDU, and then proceeds to step 845. In step 845, the Tx MAC entity submits the completed MAC PDU to a lower layer.

Figure 9:
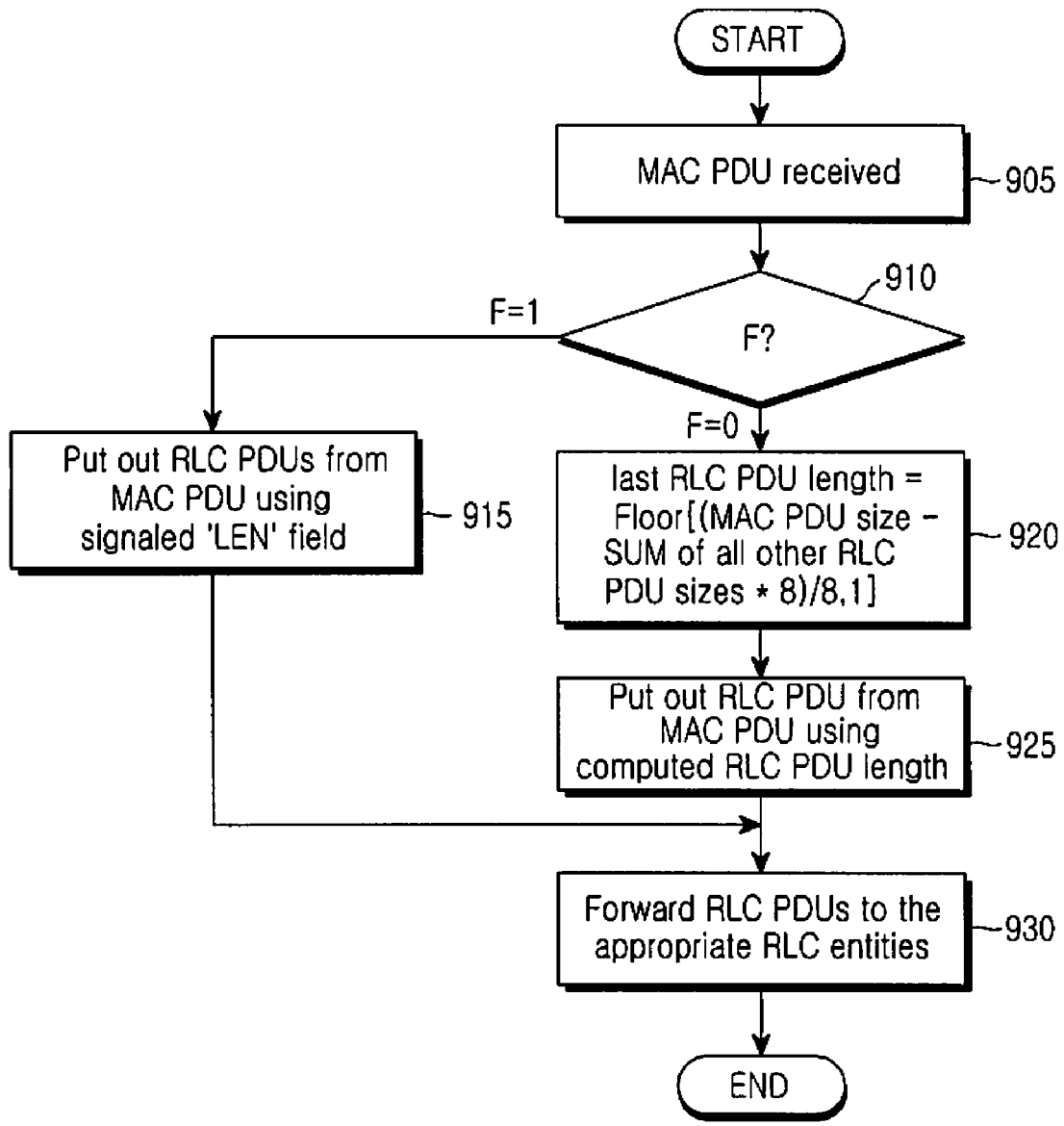
FIG. 9 is a flowchart for explaining the operation of a receiving apparatus in accordance with the second embodiment of the present invention.

FIG. 9 illustrates the operation of an Rx MAC entity according to the second embodiment of the present invention.

Referring to FIG. 9, if the Rx MAC entity receives an MAC PDU from a lower layer in step 905, the Rx MAC entity determines the value of an F field in step 910. The Rx MAC entity proceeds to step 920 if it is determined that the F field has a value of 0, and proceeds to step 915 if it is determined that the F field has a value of 1.

In step 915, the Rx MAC entity separates RLC PDUs from the MAC PDU by using the values of LEN fields accommodated in an MAC PDU header.

First, the Rx MAC entity searches for an E field set to 0, and recognizes the end portion of an LED field next to the searched E field as the starting point of an MAC PDU data part.

That is, if the Rx MAC entity identifies an MAC PDU header part and an MAC PDU data part, the Rx MAC entity sequentially analyzes LEN fields in the front of the MAC PDU to thereby separate RLC PDUs from the MAC PDU data part, and then proceeds to step 930.

In step 930, the Rx MAC entity forwards the RLC PDUs to appropriate RLC entities by making reference to LID fields in the MAC PDU header part.

If the F field has a value of 0, the Rx MAC entity proceeds to step 920. The fact that the F field has a value of 0 means that an LEN field indicating the size of the last RLC PDU is not included in the MAC PDU header part. Thus, in step 920, the Rx MAC entity calculates the length of the last RLC PDU by using Equation (3):

$$\text{Last RLC PDU length} = \text{Floor}[(\text{MAC PDU size} - \text{MAC header size} - \text{SUM of all other RLC PDU sizes}*8)/8,1] \quad (3)$$

In Equation (3), the MAC PDU size denotes the overall size of a received MAC PDU, which is signaled through a separate control channel. In Equation (3), it is assumed that the overall size of the MAC PDU is signaled in units of bits.

The MAC header size denotes the size of an MAC PDU header, expressed in bits.

If the MAC header size is subtracted from the MAC PDU size, the size of a space in which the RLC PDUs can be accommodated is calculated. In turn, if the sum of the known sizes of the RLC PDUs is subtracted from the calculated size, the length of the last RLC PDU is calculated. If the length of the last RLC PDU is divided by 8, and the quotient of the division is taken, the quotient is the very value indicating the length of the last RLC PDU, expressed in bytes.

If the overall size of the MAC PDU is signaled in units of bytes, the lengths of any RLC PDU can be derived from Equation (4):

$$\text{RLC PDU length} = \text{Floor}[(\text{MAC PDU size}*8 - \text{MAC header size} - \text{SUM of all other RLC PDU sizes}*8)/8,1] \quad (4)$$

Upon deriving the length of the RLC PDU in step 920, in step 925, the Rx MAC entity separates the RLC PDU from the MAC PDU by referring to the derived length of the RLC PDU. That is, the Rx MAC entity takes a portion corresponding to the length of the RLC PDU from the point where the MAC PDU data part starts.

Subsequently, the Rx MAC entity proceeds to step 930, and forwards the RLC PDU to an appropriate RLC entity by referring to an LID field in the MAC PDU header part.

Embodiment 3

A third embodiment of the present invention proposes an MAC PDU format and the operation of a transmitting/receiving side in the case where a specific transmission resource is allocated only to a specific service.

In a specific service, such as a VoIP service, a packet with a relatively constant size occurs in a constant cycle. For example, if an AMR codec is used and a header compression technique is applied, a packet with a size of around 300 bits occurs in a cycle of 20 msec.

For such a service in which the occurrence pattern of traffic can be predicted in advance, a transmission resource capable of processing the traffic may be allocated only for a corresponding service, and this transmission resource is called a persistent resource.

Since data of other services is not transmitted through a persistent resource, a receiving side can process an MAC PDU for a corresponding service even if LID and LEN fields are not included in an MAC PDU header. First, if the receiving side receives an MAC PDU through a persistent resource, it can be aware that the MAC PDU includes RLC PDUs of a service which is supposed to use the persistent resource. Further, if only one RLC PDU is included in one MAC PDU, the length of the RLC PDU can be derived from the size of the MAC PDU, as described in the first and second embodiment of the present invention, and thus an LEN field need not be inserted.

In a VoIP service, since a packet occurs one by one every 20 msec, there is no case where a plurality of RLC PDUs connect with each other in one MAC PDU. Thus, when a persistent resource is allocated for the VoIP service, the format of an MAC PDU to be transmitted through the persistent resource is defined as illustrated in FIG. 10.

Figure 10:
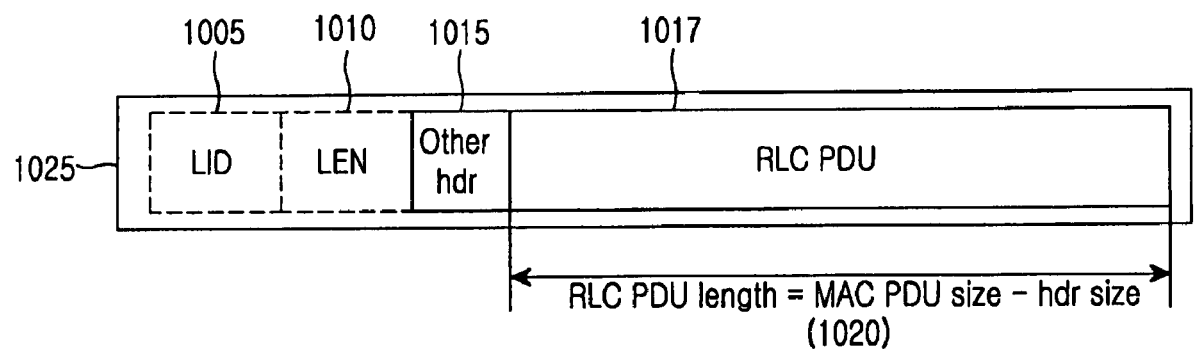
FIG. 10 is a diagram illustrating the structure of an MAC PDU in accordance with a third embodiment of the present invention.

FIG. 10 illustrates the structure of an MAC PDU according to the third embodiment of the present invention.

Referring to FIG. 10, a transmitting side removes an LID field 1005 and an LEN field 1010 from an MAC PDU header, constructs an MAC PDU with only an Other hdr field 1015 and an RLC PDU 1017, and then transmits the constructed MAC PDU. Upon receiving side receives any MAC PDU through a persistent resource, a receiving side determines that only one RLC PDU is included in the received MAC PDU, and separates the RLC PDU from the MAC PDU. With regard to this, the length of the RLC PDU is calculated by subtracting the size of the Other hdr field from the size of the MAC PDU, and the size of the Other hdr field has a fixed value.

Figure 11:
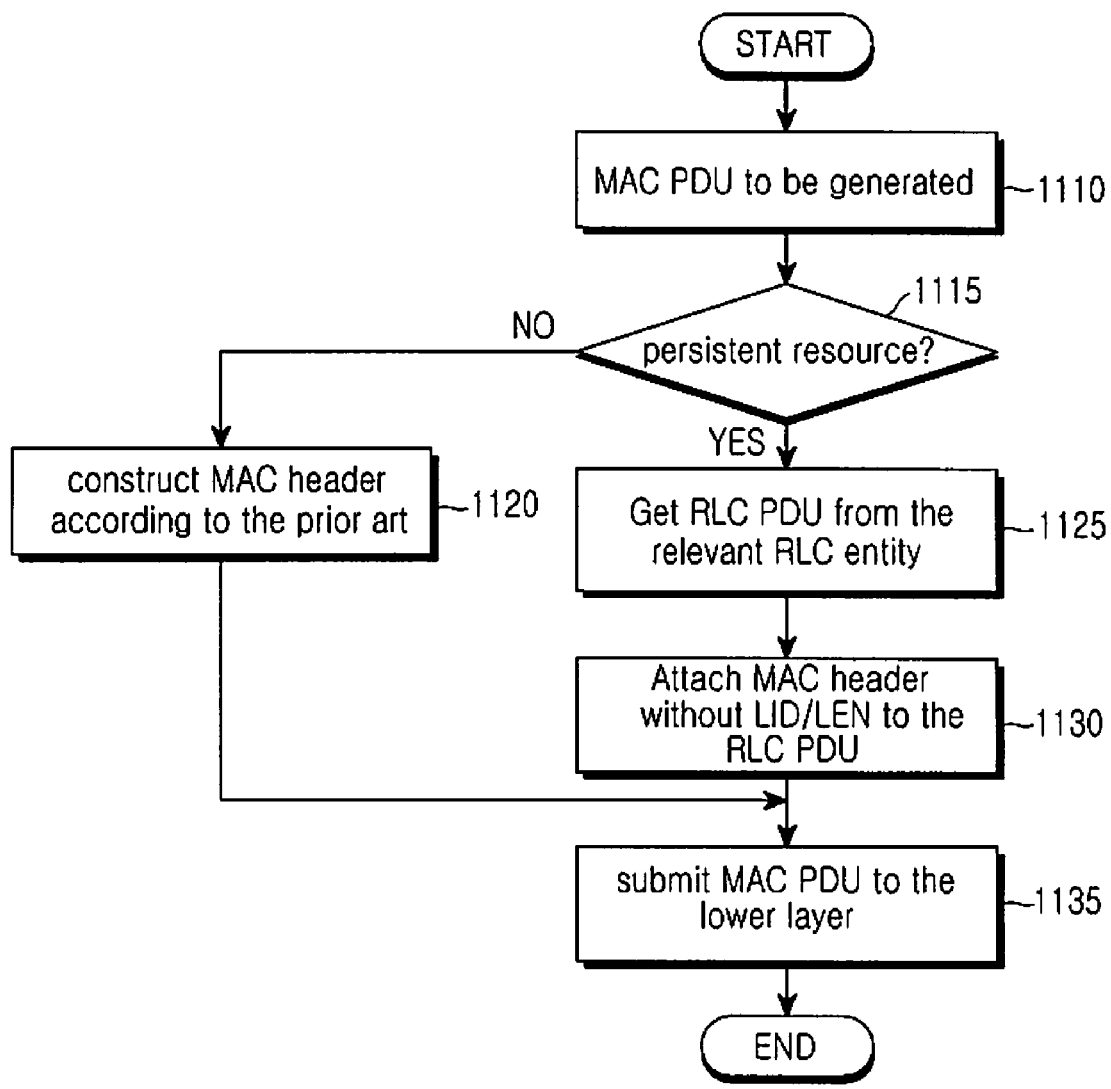
FIG. 11 is a flowchart for explaining the operation of a transmitting apparatus in accordance with the third embodiment of the present invention.

FIG. 11 illustrates the operation of a transmitting side according to the third embodiment of the present invention.

Referring to FIG. 11, in step 1105, if it is necessary to generate an MAC PDU, that is, if a transmission resource is available at the next transmission cycle, a Tx MAC entity begins to generate an MAC PDU.

In step 1115, the Tx MAC entity determines if the available resource is a persistent resource. If it is determined that the available transmission resource is not a persistent resource, the Tx MAC entity proceeds to step 1120. In step 1120, the Tx MAC entity constructs an MAC PDU according to the prior art, and then proceeds to step 1135. In step 1135, the Tx MAC entity transmits the MAC PDU by using the available transmission resource.

If it is determined that the available transmission resource is a persistent resource, in step 1125, the Tx MAC entity receives an RLC PDU from a relevant RLC entity. The relevant RLC entity refers to an RLC entity which is permitted to use the persistent resource. In step 1130, the Tx MAC entity attaches an MAC PDU header, which consists of only an Other hdr field without LID and LEN fields, to the RLC PDU to thereby construct an MAC PDU, and then proceeds to step 1135. In step 1135, the Tx MAC entity transmits the MAC PDU by using the persistent resource.

Figure 12:
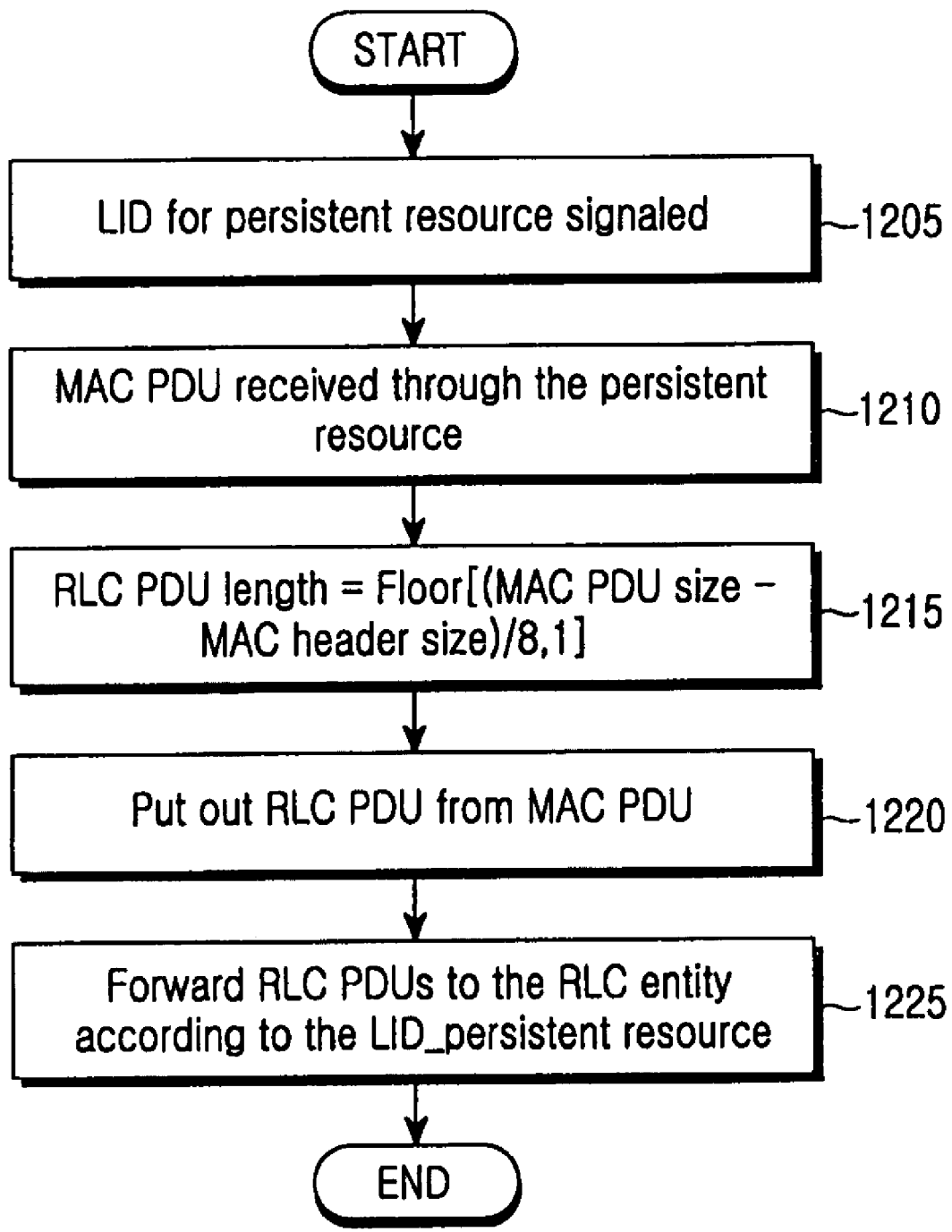
FIG. 12 is a flowchart for explaining the operation of a receiving apparatus in accordance with the third embodiment of the present invention.

FIG. 12 illustrated the operation of a receiving side according to the third embodiment of the present invention.

Referring to FIG. 12, in step 1205, an Rx MAC entity is notified of the LID of an RLC PDU to be received through a persistent resource. The LID is may be notified to transmitting and receiving sides when a persistent resource is allocated for a service which is to use the persistent resource, such as a VoIP service.

In step 1210, the Rx MAC entity receives an MAC PDU through the allocated persistent resource, and then proceeds to step 1215. In step 1215, the Rx MAC entity calculates the length of an RLC PDU according to Equation (5):

$$\text{RLC PDU length}=\text{Floor}[(\text{MAC PDU size}-\text{MAC header size})/8,1]*8 \quad (5)$$

In Equation (5), the MAC PDU size denotes the size of an MAC PDU, which is notified through a separate control channel. For a service in which a packet with a constant size occurs, such as a VoIP service, the size of the MAC PDU may be determined in advance. The MAC header size denotes the size of an Other hdr field excluding LID and LEN fields, and has a fixed value.

In step 1220, the Rx MAC entity separates an RLC PDU from the MAC PDU. The RLC PDU to be separated is a portion corresponding to the RLD PDU length in Equation (5) after the Other hdr field is removed from the MAC PUD.

In step 1225, the Rx MAC entity forwards the RLC PDU to a relevant RLC entity. The relevant RLC entity refers to an RLC entity connected to a service which is permitted to use the persistent resource, and simultaneously is an RLC entity corresponding to the LID notified in step 1205.

According to the third embodiment of the present invention, as stated above, when a VoIP packet is not multiplexed with a packet of another flow, LID and LEN fields are not included in an MAC PDU header, so that the overhead of the MAC PDU header can be reduced.

Embodiment 4

Figure 13:
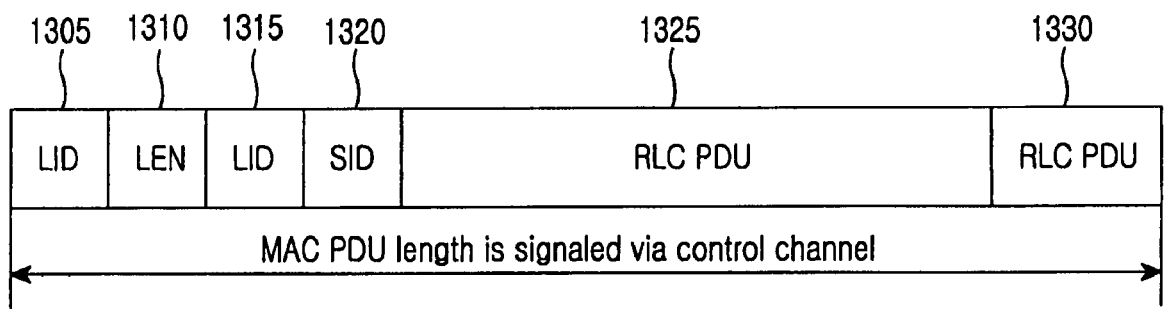
FIG. 13 is a flowchart for explaining the operation of a transmitting apparatus in accordance with a fourth embodiment of the present invention.

FIG. 13 illustrates the structure of an MAC PDU according to a fourth embodiment of the present invention.

As illustrated in FIG. 13, the fourth embodiment of the present invention proposes a way to reduce the overhead of an MAC PDU header for a service in which the size of a packet is substantially constant, such as a VoIP service, by inserting an SID field 1320, which includes collapsed information indicating the length of an RLC PDU, that is, an SID, into the MAC PDU header. Further, LID fields 1305 and 1315, and an LEN field 1310 may be included in the MAC PDU header. With regard to this, a specific code point of the SID field 1320 indicates that the length of an RLC PDU can be derived from the size of an MAC PDU, thereby efficiently meeting variableness in the size of a VoIP packet. That is, respective code points of the SID field 1320 are previously mapped to packet sizes that are likely to occur frequently, and yet at least one of the code points includes information indicating that the length of an RLC PDU can be calculated from the size of an MAC PDU, so that even when a packet with a size undefined in the SID occurs, it can be dealt with well.

Figure 14:
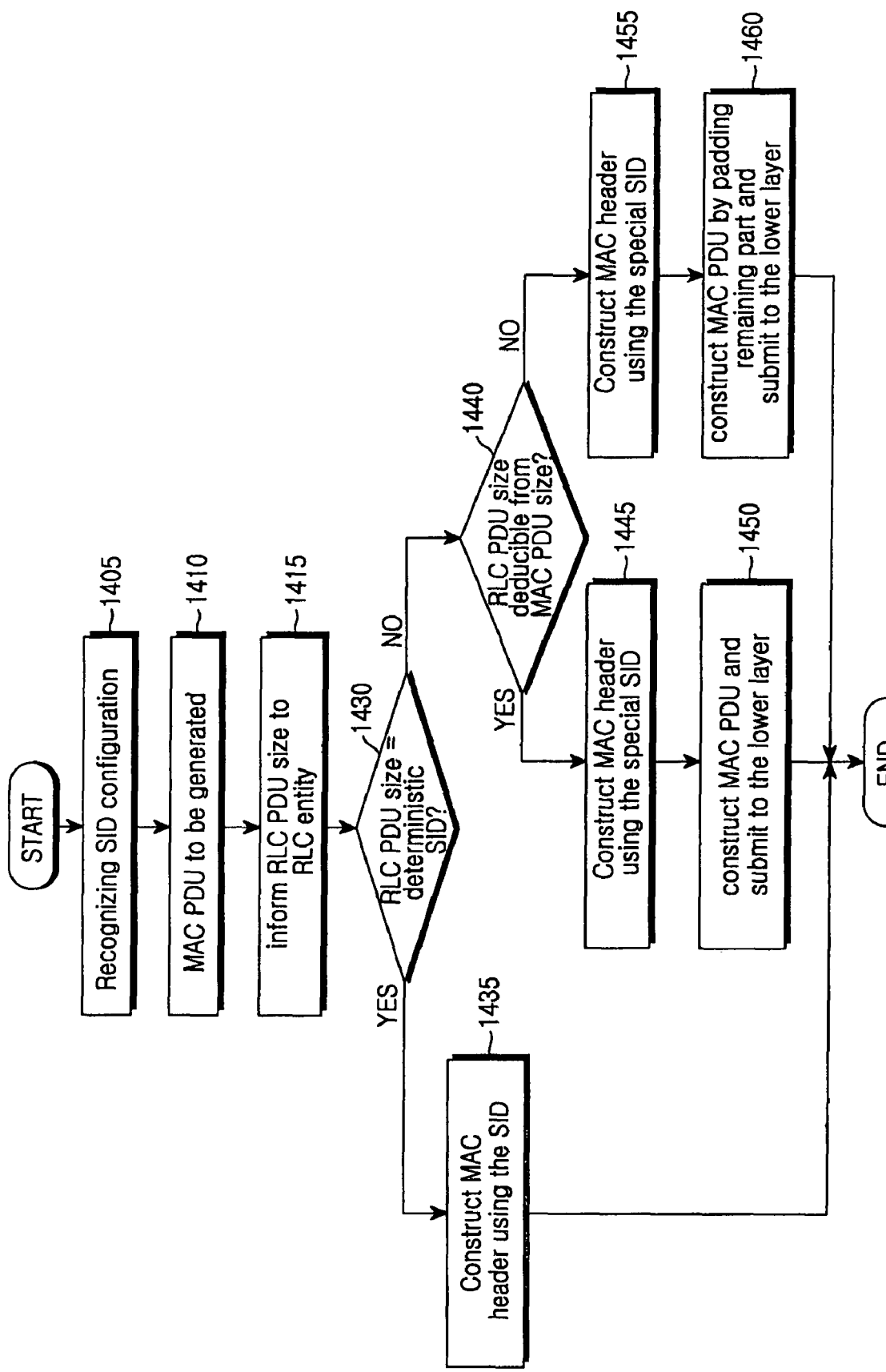
FIG. 14 is a flowchart for explaining the operation of a receiving apparatus in accordance with the fourth embodiment of the present invention.

FIG. 14 illustrate the operation of a Tx MAC entity according to the fourth embodiment of the present invention.

Referring to FIG. 14, in step 1405, the Tx MAC entity recognizes SID configuration information through a call setup process. An SID is configured according to RLC entities. In other words, a packet size meant by SID x for an RLC PDU occurring in a specific RLC entity may be different from that meant by the SID x for another RLC entity. Further, according to the characteristic of an RLC entity, the length of an RLC PDU may be represented using an SID or may be represented using an LEN field. Since the usefulness of an SID is limited to a service in which the length of an RLC PDU is limitative, an SID is configured only for RLC entities of some services, such as a VoIP service. Thus, for the other services, an SID is not configured, but a common LEN field is used. When n SIDs are configured for RLC entities, a given number of SIDs are defined by a given rule in such a manner as to indicate that the length of a corresponding RLC PDU can be derived from the size of an MAC PDU. In the following description, a given number of the SIDs are named a special SID for the convenience of explanation.

When the length of any RLC PDU is represented by a special SID, an example of a rule for calculating the length of the RLC PDU is defined by Equation (6):

$$\text{RLC PDU length meant by special SID} = \text{MAC PDU size} - \text{SUM of all MAC header sizes} - \text{SUM of all other RLC PDU sizes} - \text{padding size} \quad (6)$$

In Equation (6), the MAC PDU size denotes the size of an MAC PDU into which a corresponding RLC PDU is multiplexed, the SUM of all MAC header sizes denotes the sum of the sizes of all MAC headers accommodated in the MAC PDU, and the SUM of all other RLC PDU sizes denotes the sum of the sizes of other RLC PDUs multiplexed together with the corresponding RLC PDU. The padding size denotes the size of corresponding padding in the case of using the padding in the MAC PDU. In general, whether or not padding exists and the size of padding is designated by information included in the MAC PDU header.

Each of SIDs other than a special SID indicates the size of a specific packet, a network defines a relation between each SID and a specific packet by considering a set-up call. In the following description, an SID indicating a predetermined packet size will be referred to as a "deterministic SID" for the convenience of explanation.

In step 1410, if it is necessary to generate an MAC PDU, that is, if a transmission resource is available at the next transmission cycle; the Tx MAC entity begins to construct an MAC PDU in conformity with the size of the available transmission resource. First, the Tx MAC entity determines the size of the MAC PDU by making reference to the available resource, determines the length of an RLC PDU to be transmitted, starting from RLC entities with higher priorities, and then proceeds to step 1415. In step 1415, the Tx MAC entity notifies each RLC entity of the determined length.

To be specific, in step 1415, the Tx MAC entity, which is aware of the amount of data stored in RLC entities and the priorities of the RLD entities, first notifies the length of an RLC PDU to an RLC entity with the highest priority from among the RLD entities in which data are stored. Here, the length of the RLC PDU is such that all data stored in the RLC entity with the highest priority can be accommodated. If space still remains in the MAC PDU even after the RLC PDU is accommodated therein, the Tx MAC entity notifies the length of an RLC PDU to an RLC entity with the next highest priority. The Tx MAC entity repeats this operation until there is no more space for accommodating an RLC PDU in the MAC PDU.

If the RLC entities submit RLC PDUs, the Tx MAC entity attaches an MAC PDU header to each RLC PDU. Here, an SID or LEN field indicating the length of the RLC PDU is accommodated in the MAC PDU header.

Indicating the length of an RLC PDU by using an LEN field is the same as that in the prior art, and thus a description thereof will be omitted. In the fourth embodiment of the present invention, a description will be given of only the case where the length of a specific RLC PDU is indicated using an SID field.

In step 1430, for an RLC PDU, the length of which is to be indicated using an SID field, the Tx MAC entity determines if it is possible to indicate the length of the RLC PDU by a deterministic SID. If possible, the Tx MAC entity proceeds to step 1435, and otherwise proceeds to step 1440.

In step 1435, the Tx MAC entity constructs an MAC PDU header by using an SID corresponding to the length of the RLC PDU, and then proceeds to step 1450. In step 1450, the Tx MAC entity connects the MAC PDU header and the RLC PDU to thereby complete the generation of the MAC PDU, and then transmits the generated MAC PDU.

If the length of an RLC PDU does not correspond to any one of deterministic SIDs, the Tx MAC entity proceeds to step 1440, and determines if the length of the RLC PDU can be indicated by a special SID. That is, the Tx MAC entity determines if the length of the RLC PDU corresponds to a value obtained by subtracting the size of the MAC PDU header and sizes of other RLC PDUs from the size of the MAC PDU. If so, the Tx MAC entity proceeds to step 1445. Otherwise, the Tx MAC entity proceeds to step 1455.

In step 1445, the Tx MAC entity constructs an MAC PDU header by using a special SID, and then proceeds to step 1450. In step 1450, the Tx MAC entity connects the MAC PDU header and the RLC PDU to thereby complete the generation of the MAC PDU, and then submits the generated MAC PDU to a lower layer.

In LTE, an RLC PDU has a variable length. In other words, if an amount of data sufficient for filling an MAC PDU are stored in RLC entities, the sum of the sizes of RLC PDUs and an MAC PDU header must always correspond to the size of the MAC PDU. In this sense, step 1440 must be always true. The only exception is where the amount of data stored in RLC entities is not sufficient, and thus an MAC PDU cannot be fully filled with RLC PDUs. In this case, the length of any RLC PDU does not correspond to a value obtained by subtracting the sum of sizes of MAC PDU headers and other RLC PDUs from the size of the MAC PDU. Thus, the remaining space is filled with padding corresponding to such a difference.

In other words, proceeding to step 1455 means that the remaining space of the MAC PDU must be filled with padding. In step 1455, the Tx MAC entity constructs an MAC PDU header by using a special SID, and then proceeds to step 1460. In step 1460, the Tx MAC entity connects the MAC PDU header and the RLC PDU and inserts dummy bits, that is, padding bits, into the remaining space to thereby complete the generation of the MAC PDU. Subsequently, the Tx MAC entity submits the generated MAC PDU to a lower layer.

Figure 15:
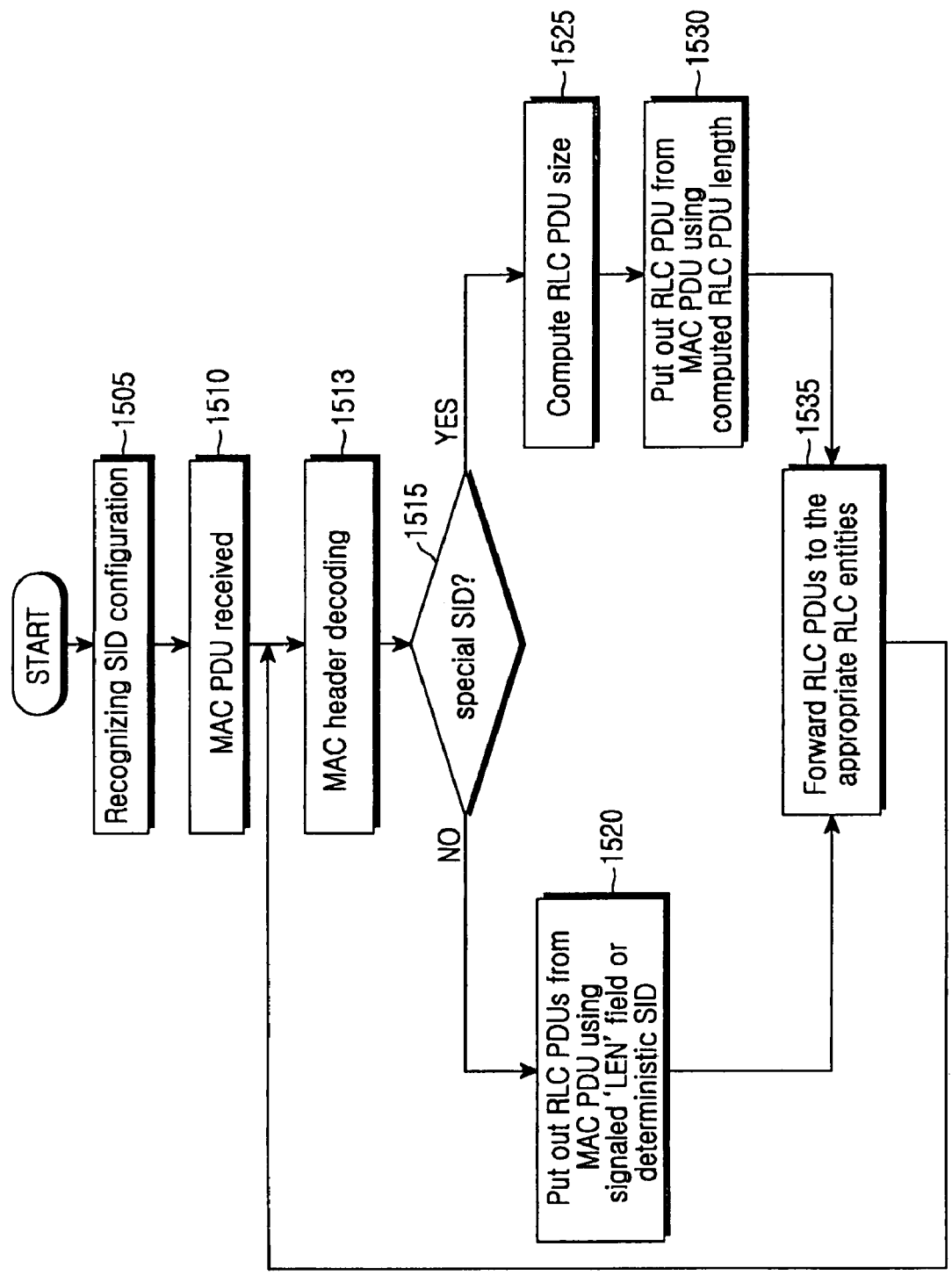
FIG. 15 is a diagram illustrating the structure of an MAC PDU in accordance with the fourth embodiment of the present invention.

FIG. 15 illustrate the operation of an Rx MAC entity according to the fourth embodiment of the present invention.

Referring to FIG. 15, in step 1505, the Rx MAC entity recognizes SID configuration through a call setup process. To be specific, the Rx MAC entity recognizes packet size values corresponding to deterministic SIDs, which SID is a special SID, and a rule for calculating the length of an RLC PDU for which the special SID is used. The calculation rule follows Equation (6) as described above.

Padding usually does not exist, and even when padding exists, this is indicated in an MAC PDU header.

Upon receiving an MAC PDU in step 1510, the Rx MAC entity proceeds to step 1513, and analyzes the first header of the MAC PDU in order to demultiplex an RLC PDU from the MAC PDU. The Rx MAC entity examines if a special SID is used in the MAC PDU header. If a special SID is used, the Rx MAC entity proceeds to step 1525, and otherwise proceeds to step 1520.

Proceeding to step 1520 means that a deterministic SID or an LEN field is used in the MAC PDU header, and the length of an RLC PDU can be discovered from the deterministic SID or the LEN field. In step 1520, after the Rx MAC entity discovers the length of a relevant RLC PDU from the deterministic SID or the LEN field, the RX MAC entity separates an RLC PDU corresponding to the length from the MAC PDU, and then proceeds to step 1535. In step 1535, the Rx MAC entity forwards the RLC PDU to an upper layer. Subsequently, the Rx MAC entity returns to step 1513, and repeats the same operation for the next MAC PDU header.

Further, proceeding to step 1525 means that the length of a relevant RLC PDU is indicated by a special SID. Thus, in step 1525, the Rx MAC entity calculates the length of the relevant RLC PDU by Equation (6) as described above.

In step 1530, the Rx MAC entity separates an RLC PDU corresponding to the calculated length from the MAC PDU, and then proceeds to step 1535. In step 1535, the Rx MAC entity forwards the RLC PDU to an upper layer. Subsequently, the Rx MAC entity returns to step 1513, and repeats the same operation for the next MAC PDU header.

Embodiment 5

A fifth embodiment of the present invention proposes a way to extend the meaning of a special SID.

In the fifth embodiment of the present invention, a plurality of special SIDs are configured, and the length of an RLC PDU, indicated by each special SIDs corresponds to a value obtained by subtracting the size of an MAC PDU header, the sum of the sizes of other RLC PDUs, and n bytes from the size of an MAC PDU. Further, control information or padding with a size of n bytes is accommodated in the rear of an RLC PDU indicated by a special SID.

Figure 16:
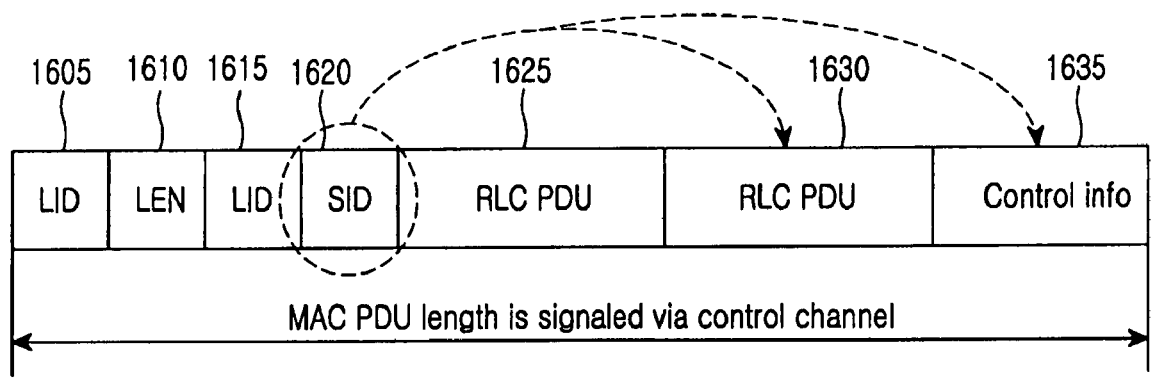
FIG. 16 is a diagram illustrating the structure of an MAC PDU in accordance with a fifth embodiment of the present invention.

FIG. 16 illustrates the operation of a Tx MAC entity according to the fifth embodiment of the present invention.

Referring to FIG. 16, in an MAC PDU header in which, for example, two RLC PDUs 1625, 1630 are accommodated, the length of the second RLC PDU 1630 is indicated by a special SID 1620. Further, LID fields 1605 and 1615, and an LEN field 1610 may be included in the MAC PDU header. If the special SID has the meaning that the length of an RLC PDU corresponds to a value obtained by subtracting an MAC PDU header, other RLC PDUs and n bytes from the size of an MAC PDU, the length of the second RLC PDU 1630 is derived from the overall size of an MAC PDU, the size of an MAC PDU header, the sizes of other RLC PDUs, and n bytes, and control information with a size of n bytes is accommodated behind the RLC PDU 1630.

When a small-sized RLC PDU, such as a VoIP packet, is transmitted together with separate control information, it is efficient to simultaneously indicate the length of the RLC PDU and the size of padding/control information by one SID in this way. The separate control information may include, for example, a buffer state report for reporting the amount of data to a scheduler. Further, padding is also considered a kind of control information:

The value of n may be set to a plurality of values, and as many special SIDs as the number of n values exist. In the fifth embodiment of the present invention, when an SID has, for example, 3 bits, the SID may be configured as given below in Table 1.

TABLE 1

| SID | RLC PDU size | SID | RLC PDU size |
|---|---|---|---|
| 0 | $x_0$ byte | 4 = | MAC PDU size − MAC hdr size − sum of sizes of all other RLC PDUs |
| 1 | $x_1$ byte | 5 = | MAC PDU size − MAC hdr size − sum of sizes of all other RLC PDUs − 1, 1 byte control info followings |
| 2 | $x_2$ byte | 6 = | MAC PDU size − MAC hdr size − sum of sizes of all other RLC PDUs − 2, 2 byte control info followings |
| 3 | $x_3$ byte | 7 = | MAC PDU size − MAC hdr size − sum of sizes of all other RLC PDUs − 4, 4 byte control info followings |

In Table 1, an SID with a value of 0, 1, 2 or 3 indicates the case where an RLC PDU with a frequently used size is inserted, and an SID with a value of 4 indicates the case where the length of a relevant RLC PDU can be deduced from the size of an MAC PDU, and control information is not included. An SID with a value of 5, 6 or 7 indicates the case where the length of a relevant RLC PDU can be deduced from the size of an MAC PDU, and yet control information of given bytes is also included.

Figure 17:
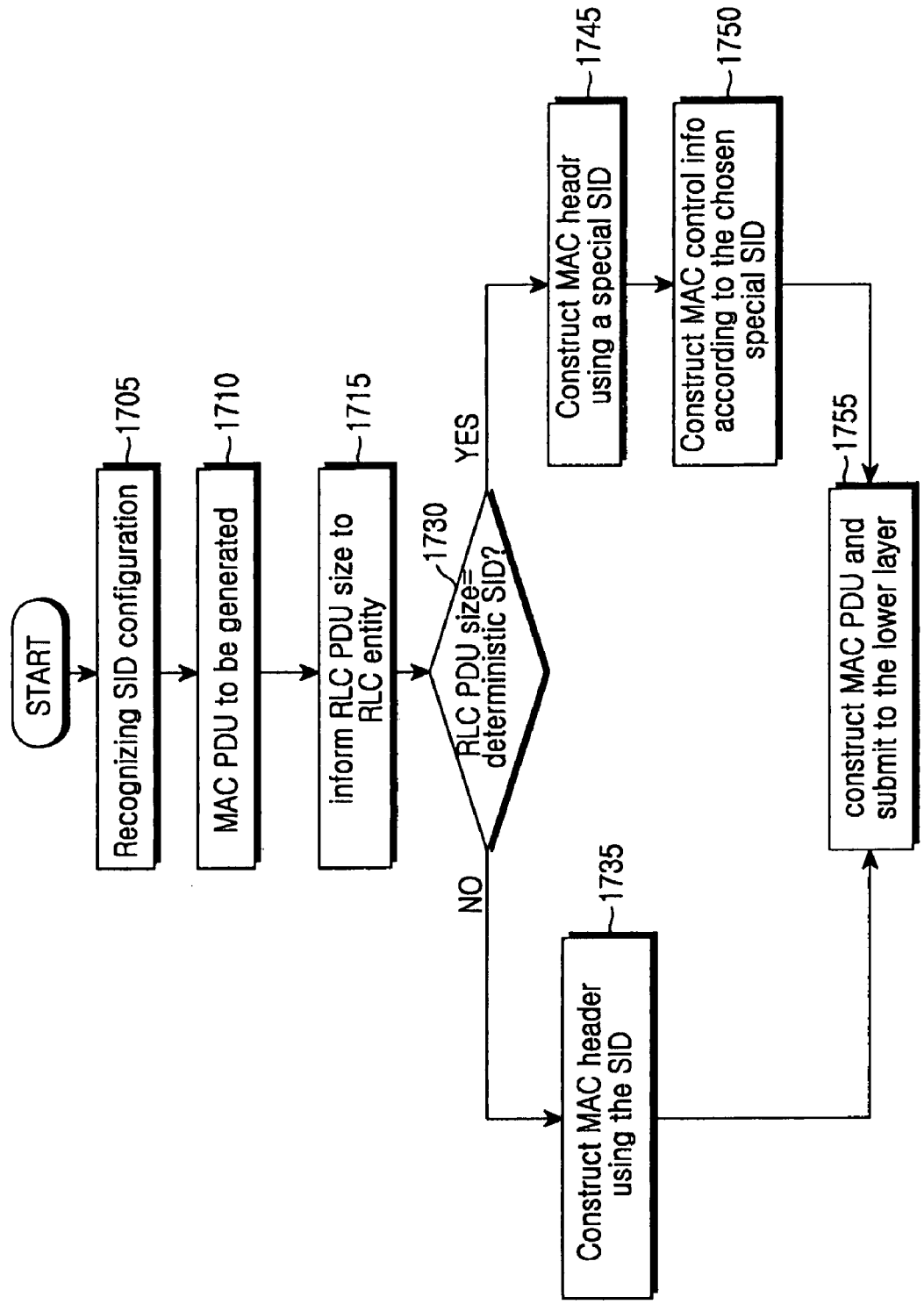
FIG. 17 is a flowchart for explaining the operation of a transmitting apparatus in accordance with the fifth embodiment of the present invention.

FIG. 17 illustrates the operation of a Tx MAC entity according to the fifth embodiment of the present invention.

Referring to FIG. 17, in step 1705, the Tx MAC entity recognizes SID configuration information through a call setup process. The SID configuration information and whether or not to use it are set up according to RLC entities. In other words, in stead of an SID field, an LEN field is used for an RLC PDU occurring in a specific RLC entity, and a special SID is used for an RLC PDU occurring in another specific RLC entity. A packet size meant by special SID x may be different from that meant by the special SID x for an RLC PDU occurring in another RLC entity. When n special SIDs are configured for any RLC entity, a given number of special SIDs are defined by a given rule in such a manner as to indicate that the length of a corresponding RLC PDU can be deduced from the size of an MAC PDU, and control information with a given size (n bytes) is included in the rear of the RLC PDU.

When the length of any RLC PDU is represented by a special SID x, an example of a rule for calculating the length of the RLC PDU is defined by Equation (7):

$$\text{RLC PDU length meant by special SID } x = \text{MAC PDU size} - \text{SUM of all MAC header sizes} - \text{SUM of all other RLC PDU sizes} - \text{control information size} \quad (7)$$

In Equation (7), different values of the MAC PDU size are used according to special SIDs, and padding is also considered a kind of control information. The MAC PDU size denotes the size of an MAC PDU into which a corresponding RLC PDU is multiplexed, the SUM of all MAC header sizes denotes the sum of the sizes of all MAC headers accommodated in the MAC PDU, and the SUM of all other RLC PDU sizes denotes the sum of the sizes of other RLC PDUs multiplexed together with the corresponding RLC PDU. Each of SIDs other than a special SID indicates the size of a specific packet, a network defines a relation between each SID and a specific packet by considering a set-up call. In the following description, an SID indicating a predetermined packet size will be referred to as a "deterministic SID" for the convenience of explanation.

In step 1710, if it is necessary to generate an MAC PDU, that is, if a transmission resource is available at the next transmission cycle, the Tx MAC entity begins to construct an MAC PDU in conformity with the size of the available transmission resource. First, the Tx MAC entity determines the size of the MAC PDU by making reference to the available resource, determines the length of an RLC PDU to be transmitted, for every RLC entity according to a given rule, and then proceeds to step 1715. In step 1715, the Tx MAC entity notifies each RLC entity of the determined length.

If the RLC entities construct RLC PDUs in conformity with the notified lengths and submit them, the Tx MAC entity attaches an MAC PDU header to each RLC PDU. Here, an SID or LEN field indicates the length of the RLC PDU.

Indicating the length of an RLC PDU by using an LEN field is the same as that in the prior art, and thus a description thereof will be omitted. In the fifth embodiment of the present invention, a description will be given of only the case where the length of a specific RLC PDU is indicated using an SID field.

In step 1730, for an RLC PDU, the length of which is to be indicated using an SID field, the Tx MAC entity checks if it is possible to indicate the length of the RLC PDU by a deterministic SID. If possible, the Tx MAC entity proceeds to step 1735, and otherwise proceeds to step 1740.

In step 1735, the Tx MAC entity constructs an MAC PDU header by using an SID corresponding to the length of the RLC PDU, and then proceeds to step 1750. In step 1750, the Tx MAC entity connects the MAC PDU header and the RLC PDU to thereby complete the generation of the MAC PDU, and then transmits the generated MAC PDU.

If the length of an RLC PDU does not correspond to any one of deterministic SIDs, the Tx MAC entity proceeds to step 1745. In step 1745, the Tx MAC entity determines a special SID to be used, and constructs an MAC PDU. If the length of an RLC PDU can be indicated by any one of special SIDs, the Tx MAC entity constructs an MAC PDU by using the special SID. However, if the length of an RLC PDU cannot be indicated by any special SID, the Tx MAC entity instructs a relevant RLC entity to discard the existing RLC PDU, newly generate an RLC PDU that can be indicated by any one of special SIDs, and then submit the generated RLC PDU thereto. Thus, the Tx MAC entity constructs an MAC PDU by using the newly forwarded RLC PDU.

In step 1750, the Tx MAC entity generates control information in conformity with the size of control information, indicated by the selected special SID, and then proceeds to step 1755. In step 1755, the Tx MAC entity connects an MAC PDU header, RLC PDUs and control information to thereby complete the generation of the MAC PDU, and then submits the generated MAC PDU to a lower layer.

Figure 18:
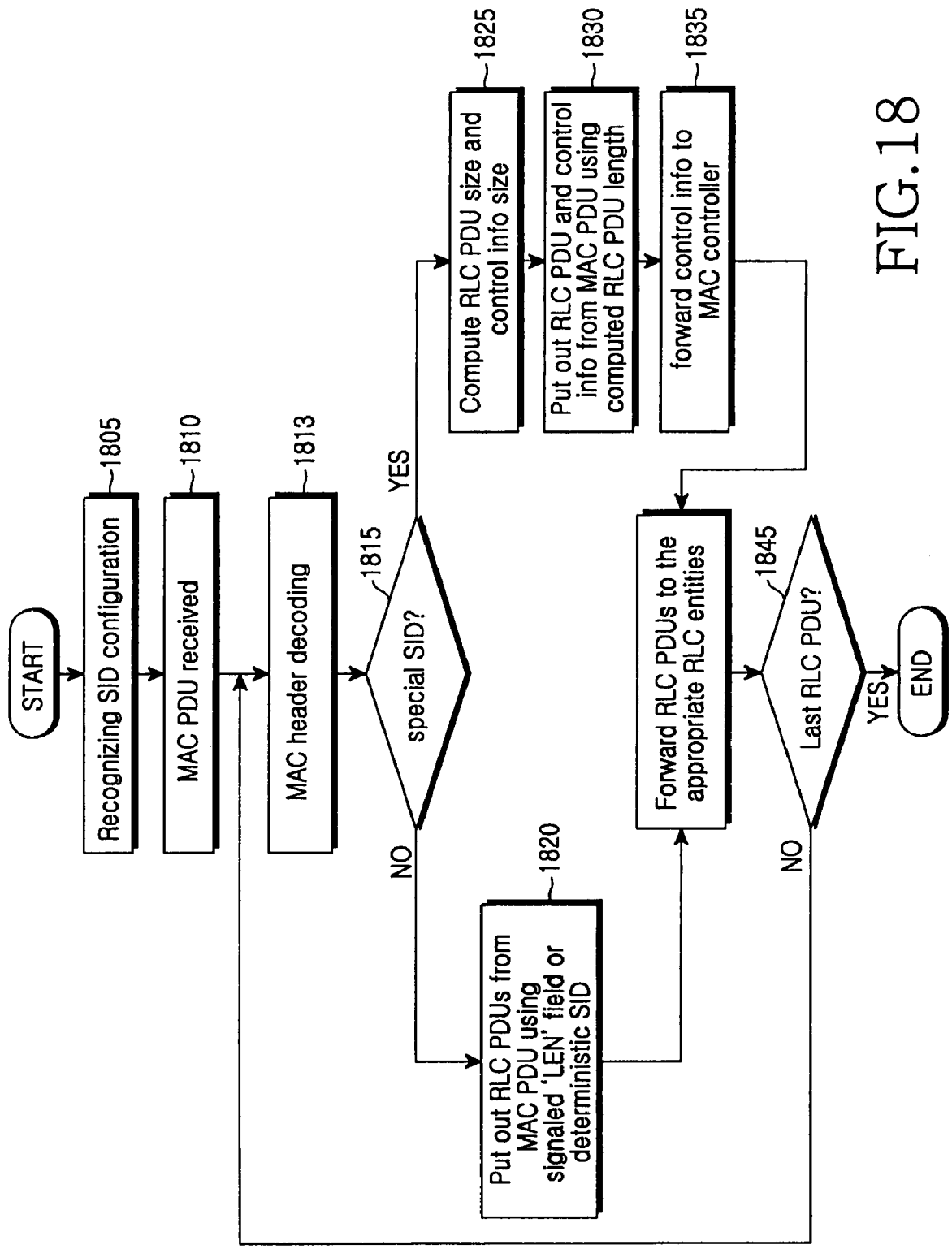
FIG. 18 is a flowchart for explaining the operation of a receiving apparatus in accordance with the fifth embodiment of the present invention.

FIG. 18 illustrate the operation of an Rx MAC entity according to the fifth embodiment of the present invention.

Referring to FIG. 18, in step 1805, the Rx MAC entity recognizes SID configuration through a call setup process. The Rx MAC entity recognizes packet size values corresponding to deterministic SIDs, which SIDs are special SIDs, and what is meant by each special SID. The length of an RLC PDU meant by each special SID is calculated by Equation (7) as described above.

According to the fifth embodiment of the present invention, a plurality of control information sizes may be configured, and as many special SIDs as the number of the control information sizes are defined.

Upon receiving an MAC PDU in step 1810, the Rx MAC entity proceeds to step 1813, and demultiplexes an RLC PDU from the MAC PDU. The Rx MAC entity examines if a special SID is used in the first header of the received MAC PDU. If a special SID is used, the Rx MAC entity proceeds to step 1825, and otherwise proceeds to step 1820.

Proceeding to step 1820 means that a deterministic SID or an LEN field is used in the MAC PDU header, and the length of an RLC PDU can be determined from the deterministic SID or the LEN field. In step 1820, after the Rx MAC entity determines the length of a relevant RLC PDU from the deterministic SID or the LEN field, the Rx MAC entity separates an RLC PDU corresponding to the length from the MAC PDU, and then proceeds to step 1835. In step 1835, the Rx MAC entity forwards the RLC PDU to an upper layer. Subsequently, the Rx MAC entity returns to step 1813, and repeats the same operation for the next MAC PDU header.

Further, proceeding from step 1815 to step 1825 means that the length of a relevant RLC PDU is indicated by a special SID. Thus, in step 1825, the Rx MAC entity calculates the length of the relevant RLC PDU and the size of control information behind the RLC PDU by Equation (8):

$$\text{RLC PDU length} = \text{MAC PDU size} - \text{SUM of all MAC header sizes} - \text{SUM of all other RLC PDU sizes} - \text{control information size meant by special SID} \quad (8)$$

In step 1830, the Rx MAC entity separates an RLC PDU corresponding to the calculated length and control information corresponding to the control information size from the MAC PDU, and then proceeds to step 1835.

In step 1835, the Rx MAC entity forwards the demultiplexed control information an MAC layer, and proceeds to step 1840. In step 1840, the Rx MAC entity forwards the demultiplexed RLC PDU to an appropriate upper layer. In step 1845, the Rx MAC entity determines if the demultiplexed RLC PDU is a last RLC PDU. If it is determined that the demultiplexed RLC PDU is not a last RLC PDU, the Rx MAC entity returns to step 1513. If it is determined that the demultiplexed RLC PDU is a last RLC PDU, the Rx MAC entity ends the demultiplexing operation.

Figure 19:
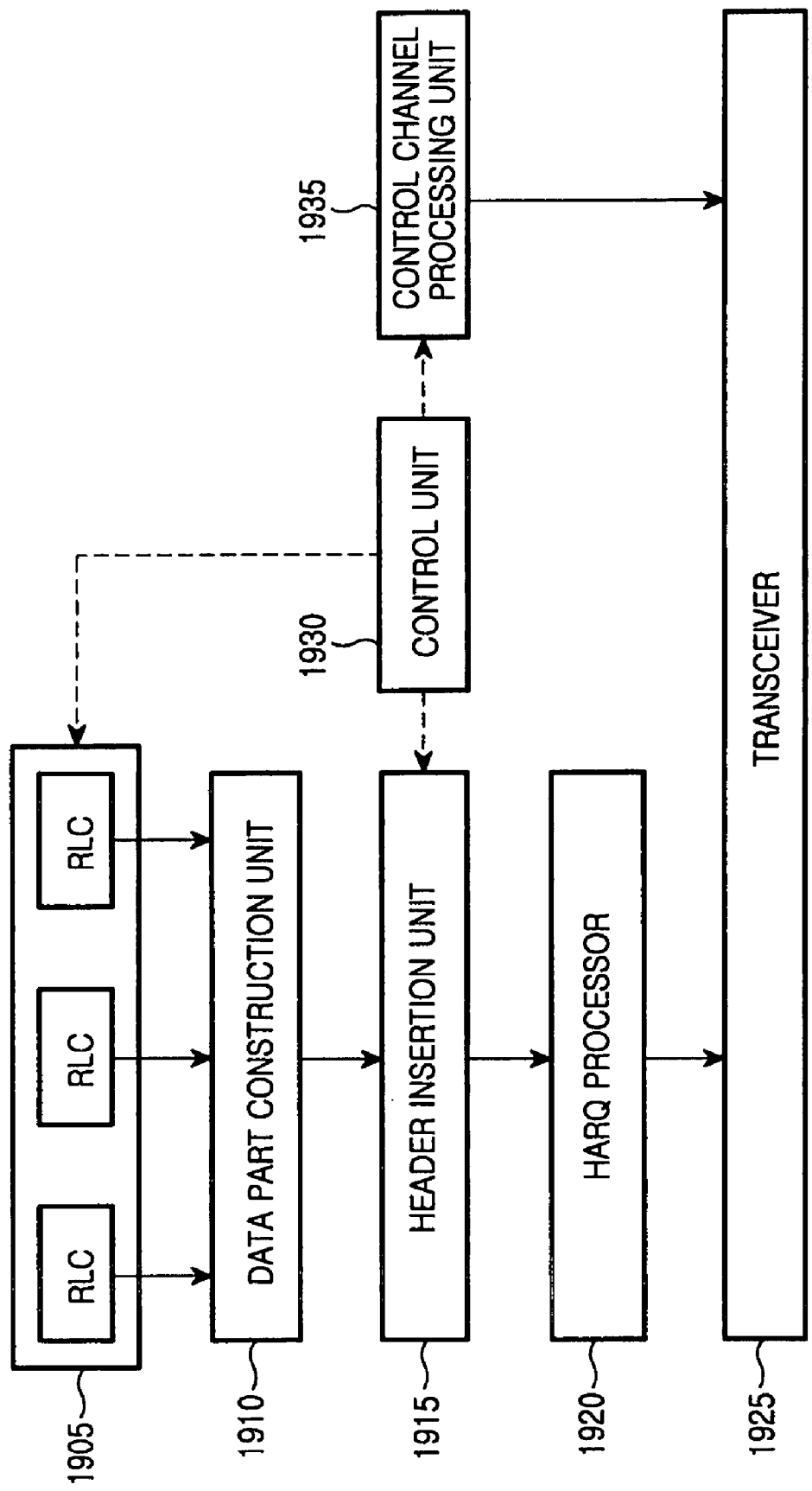
FIG. 19 is a block diagram illustrating the structure of a transmitting apparatus in accordance with an exemplary embodiment of the present invention.

FIG. 19 illustrate the structure of a transmitting apparatus according to an exemplary embodiment of the present invention.

Referring to FIG. 19, the transmitting apparatus according to this embodiment includes an RLC layer 1905, a data part construction unit 1910, a header insertion unit 1915, an HARQ processor 1920, a transceiver 1925, a control unit 1930, and a control channel processing unit 1935.

The RLC layer 1905 consists of RLC entities, in each of which an RLC PDU is generated. The RLC entity generates an RLC PDU with a size instructed by the control unit 1930, and transfers it to the data part construction unit 1910.

The data part construction unit 1910 connects RLC PDUs transferred by the RLC entities to thereby construct an MAC PDU data part, and then delivers the MAC PDU data part to the header insertion unit 1915.

The header insertion unit 1915 inserts an MAC PDU header into the MAC PDU data part and inserts padding behind the MAC PDU data part, if necessary, to thereby construct an MAC PDU, and then delivers the MAC PDU to the HARQ processor 1920. Further, when the header insertion unit 1915 generates an MAC PDU header, the header insertion unit 1915 determines if an LEN field is inserted into the PDU header, under instructions from the control unit 1930.

The HARQ processor 1920 transmits an MAC HARQ according to a prescribed HARQ operation.

The transceiver 1925 performs an operation of converting an MAC PDU into a radio signal and transmitting the radio signal, and an operation of receiving a radio signal and forwarding it to an appropriate upper processor.

If a transmission resource is allocated to the transmitting apparatus, the control unit 1930 determines RLC entities, which are to transmit RLC PDUs, by considering their priorities, etc., and determines the length of an RLC PDU. Further, the control unit 1930 instructs each of the RLC entities to generate an RLC PDU with the determined length and transfer it to the data part construction unit 1910. Further, the control unit 1930 determines the size of an MAC PDU to be transmitted, by using the allocated transmission resource, determines how it processes an LEN field in an MAC PDU header, by considering the lengths of RLC PDUs and the size of an MAC PDU, and notifies this to the header insertion unit 1915.

In the first embodiment of the present invention, the control unit 1930 instructs the header insertion unit 1915 to set an F field to 0 and not to insert an LEN field into an MAC PDU header if only one RLC PDU is accommodated in an MAC PDU, and the last byte of an RLC PDU corresponds to the last byte of the MAC PDU. Otherwise, the control unit 1930 instructs the header unit 1915 to set an F field to 1 and to insert an LEN field into an MAC PDU header.

In the second embodiment of the present invention, the control unit 1930 instructs the header insertion unit 1915 to set an F field to 0 and not to insert an LEN field for the last RLC PDU into an MAC PDU header if the last byte of the last RLC PDU corresponds to the last byte of the MAC PDU. Otherwise, the control unit 1930 instructs the header unit 1915 to set an F field to 1 and to insert LEN fields for all RLC PDUs into an MAC PDU header.

In the third embodiment of the present invention, the control unit 1930 determines if a currently available resource is a persistent resource. If the available resource is a persistent resource, the control unit 1930 instructs the header insertion unit 1915 to construct an MAC PDU header without using LID and LEN fields.

In the fourth embodiment of the present invention, the control unit 1930 controls the header insertion unit 1915 to insert an appropriate SID field into an MAC PDU header for an RLC PDU occurring in an RLC entity where an SID is used.

In the fifth embodiment of the present invention, the control unit 1930 controls the header insertion unit 1915 to insert an appropriate SID field into an MAC PDU header for an RLC PDU occurring in an RLC entity where an SID is used. If it is necessary to connect control information with a given size behind the RLC PDU, the control unit 1930 constructs control information with an appropriate size and delivers it to the data part construction unit 1910.

The control channel processing unit 1935 transmits information necessary for processing an MAC PDU over a separate control channel. The information necessary for processing an MAC PDU may include the size of the MAC PDU, and a value notified by the control unit 1930 is used as the size of the MAC PDU.

Figure 20:
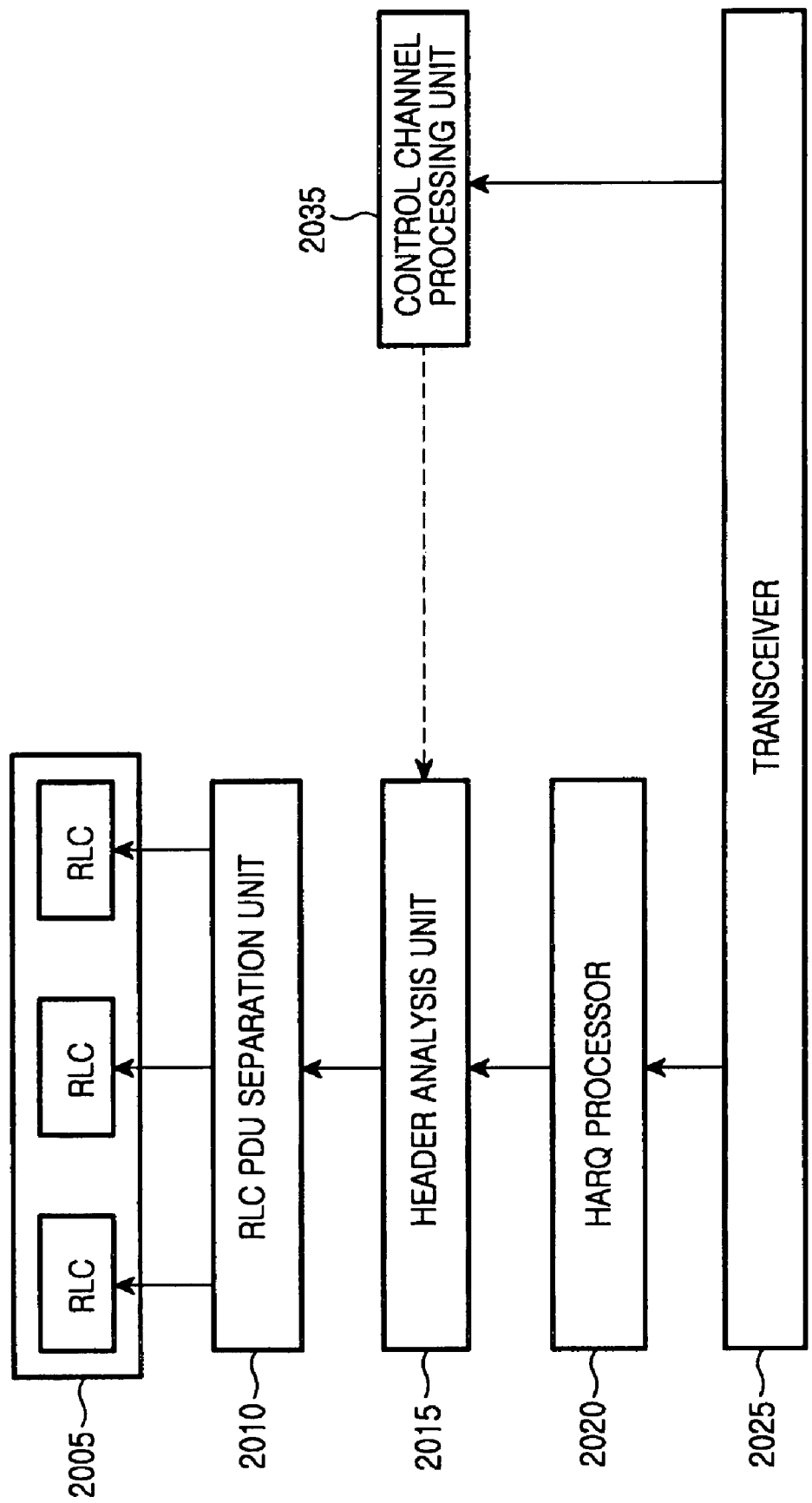
FIG. 20 is a block diagram illustrating the structure of a receiving apparatus in accordance with an exemplary embodiment of the present invention.

FIG. 20 illustrates the structure of a receiving apparatus according to an exemplary embodiment of the present invention.

Referring to FIG. 20, the receiving apparatus according to this embodiment includes an RLC layer 2005, an RLC PDU separation unit 2010, a header analysis unit 2015, an HARQ processor 2020, a transceiver 2025, and a control channel processing unit 2035.

The transceiver 2025 and the HARQ processor 2020 demodulates a radio signal into an MAC PDU through a given procedure. Further, they deliver a successfully received MAC PDU to the header analysis unit 2015.

The transceiver 2025 also receives control information necessary for processing an MAC PDU, which is transmitted over a control channel through a given procedure, and delivers the received control information to the control channel processing unit 2035.

The control channel processing unit 2035 delivers the size of an MAC PDU, which is received over a control channel, to the header analysis unit 2015.

The header analysis unit 2015 analyzes an MAC PDU header and separates an MAC PDU data part from an MAC PDU. Further, the header analysis unit 2015 delivers the separated MAC PDU data part and MAC PDU header information to the RLC PDU separation unit 2010.

In the first embodiment of the present invention, for an MAC PDU whose F field has a value of 0, the header analysis unit 2015 calculates the length of an RLC PDU by using Equation (1) or (2). For an MAC PDU whose F field has a value of 1, the header analysis unit 2015 separates an MAC PDU header part and an MAC PDU data part from the MAC PDU by sequentially analyzing an MAC PDU header.

In the second embodiment of the present invention, for an MAC PDU whose F field has a value of 0, the header analysis unit 2015 calculates the length of an RLC PDU by using Equation (3) or (4). For an MAC PDU whose F field has a value of 1, the header analysis unit 2015 separates an MAC PDU header part and an MAC PDU data part from the MAC PDU by analyzing LEN fields in an MAC PDU header.

In the third embodiment of the present invention, the header analysis unit 2015 identifies an MAC PDU transmitted through a persistent resource and an MAC PDU transmitted through a general transmission resource, and applies an MAC PDU header format appropriate to the identified MAC PDU. Further, the header analysis unit 2015 analyzes an MAC PDU header by means of the appropriate MAC PDU header format, and demultiplexes an RLC PDU from the Mac PDU.

In the fourth embodiment of the present invention, the header analysis unit 2015 analyzes an LID field of an MAC PDU header to thereby determine whether a field following the LID field is an SID field or an LEN field. If the field is an SID field, the header analysis unit 2015 deduces the length of an RLC PDU from the SID field. Further, based on the contents of the MAC PDU header, the header analysis unit 2015 demultiplexes an RLC PDU from an MAC PDU.

In the fifth embodiment of the present invention, the header analysis unit 2015 analyzes an LID field of an MAC PDU header to thereby determine whether a field following the LID field is an SID field or an LEN field. If the field is an SID field, the header analysis unit 2015 deduces the length of an RLC PDU and the length of control information from the SID field. Further, based on the contents of the MAC PDU header, the header analysis unit 2015 demultiplexes an RLC PDU and control information from an MAC PDU.

If the header analysis unit 2015 delivers an MAC PDU header part and an MAC PDU data part to the RLC PDU separation unit 2010, the RLC PDU separation unit 2010 separates an RLC PDU from an MAC PDU by using information of the MAC PDU header part, and forwards the separated RLC PDU to an appropriate RLC entity.

According to the present invention as describe above, when upper layer packets are multiplexed into a packet whose overall size is informed via a separate path, the size of the upper layer packet is not signaled if it can be calculated from the overall size of the packet, so that the size a packet transmitted/received over a radio channel can be reduced.

Further, the size of an upper layer packet is not signaled for a service in which data is transmitted through a persistent resource, so that the size a packet transmitted/received over a radio channel can be reduced.

Further, collapsed information indicating the size of an upper layer packet is signaled for a service in which the size of a packet is substantially constant, so that the size a packet transmitted/received over a radio channel can be reduced.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A method of transmitting and receiving a packet over a radio channel in a mobile communication system, the method comprising:

in a transmitting apparatus,
receiving one or more first packets from an upper layer;
generating a second packet, that includes the first packets; and
transmitting the generated second packet over the radio channel,
wherein generating the second packet comprises:
inserting one or more first information fields indicating sizes of the first packets excluding a last one of the first packets into a header of the second packet; and
in a receiving apparatus,
receiving over the radio channel a third packet, into which one or more of the fourth packets are included;
calculating a size of a last one of the fourth packets by using a size of the third packet, a size of a header of the third packet, and one or more second information fields indicating sizes of the fourth packets excluding the last one of the fourth packets inserted in the header of the third packet, and separating the fourth packets from the third packet by using the calculated size of the last one of the fourth packets; and
forwarding the separated fourth packets to the upper layer.

2. The method as claimed in claim 1, wherein generating the second packet further comprises:
determining if padding exists in the second packet; and
inserting a third information field indicating whether the padding exists, into the header of the second packet,
wherein inserting the one or more first information fields is performed when it is determined that the padding does not exist.

3. The method as claimed in claim 2, wherein generating the second packet further comprises:
inserting a fourth information field indicating whether at least one of the third information fields exists after the fourth information field.

4. The method as claimed in claim 1, further comprising:
determining if the one or more second information fields indicating the sizes of the fourth packets excluding the last one of the fourth packets included into the third packet is included in the header of the third packet,
wherein the calculating the size of the last one of the fourth packets is performed when it is determined that the second information fields indicating the sizes of the fourth packets does not include the last one of the first packets.

5. The method as claimed in claim 4, wherein determining step is performed according to a fifth information field, inserted in the header of the third packet, indicating whether padding exists in the third packet.

6. The method as claimed in claim 4, further comprising:
determining, according to a sixth information field included in the header of the third packet, whether at least one of the second information fields exists after the sixth information field t.

7. An apparatus for transmitting and receiving a packet over a radio channel in a mobile communication system, the apparatus comprising:
in a transmitting section,
a generation unit for receiving one or more first packets from an upper layer, and generating a second packet, that includes the first packets; and
a processor for transmitting the generated second packet over the radio channel,
wherein the generation unit further inserts one or more first information fields indicating sizes of the first packets excluding a last one of the first packets into a header of the second packet; and
in a receiving section,
a processor for receiving, over the radio channel, a third packet, into which one or more fourth packets are included;
a header analysis unit for calculating a size of a last one of the fourth packets by using a size of the third packet, a size of a header of the third packet, and one or more second information fields indicating sizes of the fourth packets excluding the last one of the fourth packets inserted in the header of the third packet; and
a first packet separation unit for separating the fourth packets from the third packet by using the calculated size of the last one of the fourth packets, and forwarding the separated fourth packets to the upper layer.

8. The apparatus as claimed in claim 7, wherein the generation unit further determines if padding exists in the second packet, and further inserts a third information field indicating whether the padding exists, into the header of the second packet;
wherein the generation unit inserts the one or more first information fields when it is determined that the padding does not exist.

9. The apparatus as claimed in claim 8, wherein the generation unit further inserts a fourth information field indicating whether at least one of the first information fields exists after the fourth information field.

10. The apparatus as claimed in claim 7, wherein the header analysis unit further determines if the one or more second information fields indicating the sizes of the fourth packets excluding the last one of the fourth packets included into the third packet is included in the header of the third packet, and calculates the size of the last one of the fourth packets when it is determined that the second information fields indicating the sizes of the fourth packets does not include the last one of the fourth packets.

11. The apparatus as claimed in claim 7, wherein the header analysis unit determines according to a fifth information field, inserted in the header of the third packet, indicating whether padding exists in the third packet.

12. The apparatus as claimed in claim 11, wherein the header analysis unit further determines, according to a sixth information field included in the header of the third packet, whether at least one of the second information fields exists after the sixth information field.

* * * * *

UNITED STATES PATENT AND TRADEMARK OFFICE
CERTIFICATE OF CORRECTION

| | |
|---|---|
| PATENT NO. | : 8,059,681 B2 |
| APPLICATION NO. | : 11/799675 |
| DATED | : November 15, 2011 |
| INVENTOR(S) | : Soeng-Hun Kim et al. |

Page 1 of 1

It is certified that error appears in the above-identified patent and that said Letters Patent is hereby corrected as shown below:

IN THE CLAIMS

In Claim 1, in line 35 of column 25, "one or more of the fourth packets" should be -- one or more fourth packets --.

Signed and Sealed this
Twelfth Day of January, 2016

Michelle K. Lee
*Director of the United States Patent and Trademark Office*